(12) United States Patent
Vu et al.

(10) Patent No.: US 12,294,520 B1
(45) Date of Patent: May 6, 2025

(54) SYSTEMS AND METHODS FOR OPTIMIZING DATA TRANSMISSION IN A CAPACITY CONSTRAINED DATA COMMUNICATION NETWORK

(71) Applicant: KBR Wyle Services, LLC, Houston, TX (US)

(72) Inventors: Hoai Xuan Vu, Westminster, CA (US); Can Xuan Vu, Westminster, CA (US); Dao Ngoc Vu, Westminster, CA (US)

(73) Assignee: KBR WYLE SERVICES, LLC, Houston, TX (US)

( * ) Notice: Subject to any disclaimer, the term of this patent is extended or adjusted under 35 U.S.C. 154(b) by 0 days.

(21) Appl. No.: 18/499,659

(22) Filed: Nov. 1, 2023

(51) Int. Cl.
*H04L 47/12* (2022.01)
*H04L 47/24* (2022.01)

(52) U.S. Cl.
CPC .............. *H04L 47/12* (2013.01); *H04L 47/24* (2013.01)

(58) Field of Classification Search
CPC ..... H04L 67/63; H04L 41/0894; H04L 43/08; H04L 47/20; H04L 47/805; H04L 47/828; H04L 47/24; H04L 45/306; H04L 43/55; H04L 41/5016
See application file for complete search history.

(56) References Cited

U.S. PATENT DOCUMENTS

| 2022/0393972 | A1* | 12/2022 | Salkintzis | H04L 47/805 |
| 2024/0243936 | A1* | 7/2024 | Yao | H04L 67/12 |

FOREIGN PATENT DOCUMENTS

| CN | 104393394 A | 3/2015 |
| CN | 109218747 B | 5/2020 |
| CN | 113923791 A | 1/2022 |
| CN | 114040453 A | 2/2022 |
| CN | 114785403 A | 7/2022 |
| CN | 115103377 A | 9/2022 |
| CN | 115765843 A | 3/2023 |

(Continued)

OTHER PUBLICATIONS

Cacchiani et al. (Feb. 2022) "Knapsack problems—An overview of recent advances. Part II: Multiple, multidimensional, and quadratic knapsack problems," Computers & Operations Research 143. (14 pages).

(Continued)

*Primary Examiner* — Jerry B Dennison
(74) *Attorney, Agent, or Firm* — Gary M. Machetta

(57) ABSTRACT

A method for managing data transmissions includes: receiving data transmission requests; and determining which requests to accept such that a constraint of a network communication pathway is not exceeded, by: selecting a set of requests based on value densities, determining a first non-selected request that doesn't exceed a residual amount, determining whether a second non-selected request exists for which: (1) its value density is greater than a combined value density of the first non-selected request and a request of the selected requests that has a lowest value density, and (2) its demand is the largest among non-selected requests meeting requirement (1) that is no larger than a sum of the residual amount and a demand of a lowest value density selected request, and if it exists, replacing the lowest value density selected request with the second non-selected request and, if not, include the first non-selected request as a selected request.

26 Claims, 12 Drawing Sheets

(56) References Cited

FOREIGN PATENT DOCUMENTS

| | | |
|---|---|---|
| CN | 111683381 B | 4/2023 |
| KR | 10-1396884 B1 | 5/2014 |

OTHER PUBLICATIONS

Cacchiani et al. (Feb. 2022). "Knapsack problems—An overview of recent advances. Part I: Single knapsack problems," Computers & Operations Research 143. (14 pages).

Chen et al. (Apr. 2022). "Approximation Algorithms for Interdiction Problem with Packing Constraints," arXiv:2204.11106v1; (46 pages).

Cicek et al. (Aug. 2020). "Backhaul-Aware Optimization of UAV Base Station Location and Bandwidth Allocation for Profit Maximization," IEEE Access 8: 154573-154588.

Csébfalvi et al. "The Multidimensional 0-1 Knapsack Problem A New Heuristic Algorithm Combined with 0-1 Linear Programming," Proceedings of the International Conference on Evolutionary Computation Theory and Applications (ECTA-2011), Oct. 24-26, 2011, Paris, France; pp. 203-207.

Köse et al. "Resource Allocation for Underlaying Device-to-Device Communications Using Maximal Independent Sets and Knapsack Algorithm," 2018 IEEE 29th Annual International Symposium on Personal, Indoor, and Mobile Radio Communications (PIMRC), Sep. 9-12, 2018, Bologna, Italy; 5 pages.

Morrison et al. (2016). "Branch-and-bound algorithms: A survey of recent advances in searching, branching, and pruning," Discrete Optimization 19:79-102.

Pasandideh et al. (Mar. 2023). "An Improved Particle Swarm Optimization Algorithm for UAV Base Station Placement," Wireless Personal Communications. (28 pages).

\* cited by examiner

SYSTEMS AND METHODS FOR OPTIMIZING DATA TRANSMISSION IN A CAPACITY CONSTRAINED DATA COMMUNICATION NETWORK

FIELD

The present disclosure is related, generally, to data communication networks, and more specifically, to optimizing data transmission within a data communication network.

BACKGROUND

A data communication network typically includes multiple data communication nodes interconnected by multiple links, resulting in multiple communication pathways for data to traverse the network. The data communication nodes can include any combination of ground-based and/or satellite-based communications systems. The data communication network can include end nodes, such as servers, clients, user devices, etc., that serve as data sources and/or data sinks. Communications between these end nodes traverse the communication pathways of the network. Determining how various data communication should traverse the network is often a complex task for network operators. In some cases, the demands of end nodes may exceed the capabilities of one or more of the data communication pathways. As such, not all demands of a given set of end nodes seeking to use a given data communication node may be accepted at a given point in time.

SUMMARY

Systems and methods include determining which data communications requests for use of a communication pathway should be accepted where the aggregate demand of all of the requests for use of a communication pathway exceeds at least one constraint of the communication pathway. The determination can include seeking to maximize a value and/or value density of the selected set of requests to accept. The value density for a given request may be a function of a value associated with each request and the demand of the request. A value can be for example, a fee the requestor is willing to pay for the request to be accepted or a priority associated with the requestor. Requests can include demands for different capabilities of a communication pathway that include different constraints, and the determination of which requests to accept can include selecting the set of requests that results in minimizing the aggregate residual space across the capabilities of the communication pathway. The residual space for a given capability of the communication pathway can be defined as the difference between the constraint of the capability (e.g., the maximum data rate) and the sum of the demands for the capability of the selected set of requests. Such techniques can find approximations of optimal solutions, balancing the countervailing interests of finding the optimal solution and avoiding unacceptable computational penalties (e.g., excessive computation time). Through the techniques described herein, the systems and methods can determine which requests to accept when the requests exceed at least one constraint of a data communication node in a complex communications network without excessive computational penalties.

According to an aspect, a method for managing data transmissions of a communication network includes receiving requests from a plurality of data transmission requestors requesting data transmissions via a communication pathway of a communication network, the communication pathway having at least one data transmission constraint that is exceeded by an aggregate of at least one corresponding demand of the requests; and determining which requests to accept such that the at least one data transmission constraint is not exceeded, wherein determining which requests to accept comprises: selecting a set of requests to accept based on value densities of the requests such that the at least one data transmission constraint is not exceeded, wherein the value densities are each a function of a value associated with at least one characteristic of a respective request and the at least one demand of the respective request, and wherein a total of the at least one demand of the selected set of requests to accept is less than the at least one data transmission constraint by at least one residual amount, determining a first non-selected request for which the at least one demand of the first non-selected request does not exceed the at least one residual amount, determining whether a second non-selected request exists for which: (1) a value density of the second non-selected request is greater than a combined value density of the first non-selected request and a request of the selected set of requests that has a lowest value density, and (2) a demand of the second non-selected request is the largest demand among all non-selected requests meeting requirement (1) that is no larger than a sum of the at least one residual amount and a demand of the request of the selected set of requests that has the lowest value density, in accordance with determining that the second non-selected request exists, updating the selected set of requests to accept by replacing the selected request having the lowest value density of the selected set of requests with the second non-selected request, and in accordance with determining that the second non-selected request does not exist, updating the selected set of requests to accept to include the first non-selected request.

The at least one demand may include a data communication rate demand and the at least one data transmission constraint may include a data communication rate capacity. The at least one demand may include an uplink demand and a downlink demand and the at least one data transmission constraint may include an uplink constraint and a downlink constraint. The at least one demand may include multiple data communication rate demands for different data types and the at least one data transmission constraint may include corresponding data communication rate capacities for the different data types.

The communication pathway may include at least one satellite and/or at least one router. The at least one characteristic of each of the requests may be a price paid by a respective requestor for communication via the communication pathway and/or a priority associated with the respective request or the respective requestor.

The at least one demand may be represented as a multiple of a base demand, and determining which requests to accept may include representing at least one request as a plurality of artificial requests that each have the base demand, wherein a number of the plurality of artificial requests is the multiple of the base demand. Optionally, determining which requests to accept may include determining a demand to accept for a respective request based on a number of artificial requests associated with the respective request that are in the set of requests to accept.

The method may include transmitting data via the communication pathway according to the determination of which requests to accept. Selecting the set of requests to accept based on value densities of the requests such that the at least one data transmission constraint is not exceeded may include ranking the requests based on the value densities and selecting a first k requests in the ranking having the highest value densities that, in aggregate, do not exceed the at least one data transmission constraint. Updating the selected set of requests to accept may generate an updated set of requests to accept, and determining which requests to accept may include determining a request that is not in the updated set of requests to accept that can replace at least one request in the updated set of requests to accept to increase a total of the value associated with the at least one characteristic for the requests to accept.

According to an aspect, a system for managing data transmissions of a communication network includes one or more processor and memory storing one or more programs executable by the one or more processors, the one or more programs including instructions for causing the one or more processors to perform a method comprising: receiving requests from a plurality of data transmission requestors requesting data transmissions via a communication pathway of a communication network, the communication pathway having at least one data transmission constraint that is exceeded by an aggregate of at least one corresponding demand of the requests; and determining which requests to accept such that the at least one data transmission constraint is not exceeded, wherein determining which requests to accept includes: selecting a set of requests to accept based on value densities of the requests such that the at least one data transmission constraint is not exceeded, wherein the value densities are each a function of a value associated with at least one characteristic of a respective request and the at least one demand of the respective request, and wherein a total of the at least one demand of the selected set of requests to accept is less than the at least one data transmission constraint by at least one residual amount, determining a first non-selected request for which the at least one demand of the first non-selected request does not exceed the at least one residual amount, determining whether a second non-selected request exists for which: (1) a value density of the second non-selected request is greater than a combined value density of the first non-selected request and a request of the selected set of requests that has a lowest value density, and (2) a demand of the second non-selected request is the largest demand among all non-selected requests meeting requirement (1) that is no larger than a sum of the at least one residual amount and a demand of the request of the selected set of requests that has the lowest value density, in accordance with determining that the second non-selected request exists, updating the selected set of requests to accept by replacing the selected request having the lowest value density of the selected set of requests with the second non-selected request, and in accordance with determining that the second non-selected request does not exist, updating the selected set of requests to accept to include the first non-selected request.

The at least one demand may include a data communication rate demand and the at least one data transmission constraint may include a data communication rate capacity. The at least one demand may include an uplink demand and a downlink demand and the at least one data transmission constraint may include an uplink constraint and a downlink constraint. The at least one demand may include multiple data communication rate demands for different data types and the at least one data transmission constraint may include corresponding data communication rate capacities for the different data types.

The communication pathway may include at least one satellite and/or may include at least one router. The at least one characteristic of each of the requests may be a price paid by a respective requestor for communication via the communication pathway and/or a priority associated with the respective request or the respective requestor.

The at least one demand may be represented as a multiple of a base demand, and determining which requests to accept may include representing at least one request as a plurality of artificial requests that each have the base demand, wherein a number of the plurality of artificial requests is the multiple of the base demand. Optionally, determining which requests to accept may include determining a demand to accept for a respective request based on a number of artificial requests associated with the respective request that are in the set of requests to accept.

The one or more programs may include instructions for transmitting data via the communication pathway according to the determination of which requests to accept. Selecting the set of requests to accept based on value densities of the requests such that the at least one data transmission constraint is not exceeded may include ranking the requests based on the value densities and selecting a first k requests in the ranking having the highest value densities that, in aggregate, do not exceed the at least one data transmission constraint. Updating the selected set of requests to accept may generate an updated set of requests to accept, and determining which requests to accept may include determining a request that is not in the updated set of requests to accept that can replace at least one request in the updated set of requests to accept to increase a total of the value associated with the at least one characteristic for the requests to accept.

According to an aspect, a method for managing data transmissions of a communication network includes: receiving requests from a plurality of data transmission requestors requesting data transmissions via a communication pathway of a communication network, the communication pathway having a plurality of data transmission constraints, at least one of which is exceeded by an aggregate of at least one corresponding demand of the requests; and determining which requests to accept such that the data transmission constraints are not exceeded, wherein determining which requests to accept comprises: selecting a set of requests to accept such that the data transmission constraints are not exceeded, wherein for each data transmission constraint, a total of the corresponding demands of the selected set of requests to accept is less than the data transmission constraint by a corresponding constraint slack, determining a set of non-selected requests such that each non-selected request in the set of non-selected requests has demands that fit within the corresponding constraint slacks, and updating the selected set of requests to accept to include one or more requests of the set of non-selected requests such that a residual space is reduced, wherein the residual space is a sum of the constraint slacks.

The communication pathway may include a plurality of data communication capabilities, wherein each data transmission constraint corresponds to one of the plurality of data communication capabilities. The plurality of data communication capabilities may include a plurality of communication channels. Each communication channel may be used for transmitting a different type of data.

The demands of the requests may include a data communication rate demand and the data transmission constraints may include a data communication rate capacity. The demands of the requests may include an uplink demand and a downlink demand and the data transmission constraints may include an uplink constraint and a downlink constraint.

The demands of the requests may include multiple data communication rate demands for different data types and the data transmission constraints may include corresponding data communication rate capacities for the different data types. The communication pathway may include at least one satellite and/or at least one router.

A demand of a respective request may be represented as a multiple of a base demand, and determining which requests to accept may include representing the respective request as a plurality of artificial requests that each have the base demand, wherein a number of the plurality of artificial requests is the multiple of the base demand. Determining which requests to accept may include determining a demand to accept for the respective request based on a number of artificial requests associated with the respective request that are in the set of requests to accept.

The method may include transmitting data via the communication pathway according to the determination of which requests to accept. Determining which requests to accept such that the data transmission constraints are not exceeded may include associating with each request at least one artificial demand that corresponds to at least one value associated with the request and setting at least one artificial constraint associated with the at least one artificial demand, wherein the residual space includes at least one constraint slack associated with the at least one artificial demand and the at least one artificial constraint. Determining which requests to accept may include determining whether at least one non-selected request can replace at least one selected request for reduction in residual space.

Determining whether at least one non-selected request can replace at least one selected request for reduction in residual space may include: (a) if there are more non-selected requests than selected requests, for each non-selected request, determining whether the non-selected request can replace one of the selected requests for reduction in the residual space; and (b) if there are more selected requests than non-selected requests, for each selected request, determining whether the selected request can be replaced by one of the non-selected request for reduction in the residual space.

According to an aspect, a system for managing data transmissions of a communication network includes one or more processor and memory storing one or more programs executable by the one or more processors, the one or more programs including instructions for causing the one or more processors to perform a method that includes: receiving requests from a plurality of data transmission requestors requesting data transmissions via a communication pathway of a communication network, the communication pathway having a plurality of data transmission constraints, at least one of which is exceeded by an aggregate of at least one corresponding demand of the requests; and determining which requests to accept such that the data transmission constraints are not exceeded, wherein determining which requests to accept includes: selecting a set of requests to accept such that the data transmission constraints are not exceeded, wherein for each data transmission constraint, a total of the corresponding demands of the selected set of requests to accept is less than the data transmission constraint by a corresponding constraint slack, determining a set of non-selected requests such that each non-selected request in the set of non-selected requests has demands that fit within the corresponding constraint slacks, and updating the selected set of requests to accept to include one or more requests of the set of non-selected requests such that a residual space is reduced, wherein the residual space is a sum of the constraint slacks.

The communication pathway may include a plurality of data communication capabilities, wherein each data transmission constraint corresponds to one of the plurality of data communication capabilities. The plurality of data communication capabilities may include a plurality of communication channels. Each communication channel may be used for transmitting a different type of data.

The demands of the requests may include a data communication rate demand and the data transmission constraints may include a data communication rate capacity. The demands of the requests may include an uplink demand and a downlink demand and the data transmission constraints may include an uplink constraint and a downlink constraint. The demands of the requests may include multiple data communication rate demands for different data types and the data transmission constraints may include corresponding data communication rate capacities for the different data types. The communication pathway may include at least one satellite and/or at least one router.

A demand of a respective request may be represented as a multiple of a base demand, and determining which requests to accept may include representing the respective request as a plurality of artificial requests that each have the base demand, wherein a number of the plurality of artificial requests is the multiple of the base demand. Determining which requests to accept may include determining a demand to accept for the respective request based on a number of artificial requests associated with the respective request that are in the set of requests to accept.

The one or more programs may include instructions for transmitting data via the communication pathway according to the determination of which requests to accept. Determining which requests to accept such that the data transmission constraints are not exceeded may include associating with each request at least one artificial demand that corresponds to at least one value associated with the request and setting at least one artificial constraint associated with the at least one artificial demand, wherein the residual space includes at least one constraint slack associated with the at least one artificial demand and the at least one artificial constraint. Determining which requests to accept may include determining whether at least one non-selected request can replace at least one selected request for reduction in residual space.

Determining whether at least one non-selected request can replace at least one selected request for reduction in residual space may include: (a) if there are more non-selected requests than selected requests, for each non-selected request, determining whether the non-selected request can replace one of the selected requests for reduction in the residual space; and (b) if there are more selected requests than non-selected requests, for each selected request, determining whether the selected request can be replaced by one of the non-selected request for reduction in the residual space.

BRIEF DESCRIPTION OF THE DRAWINGS

The invention will now be described, by way of example only, with reference to the accompanying drawings, in which.

DETAILED DESCRIPTION

Figure 1:
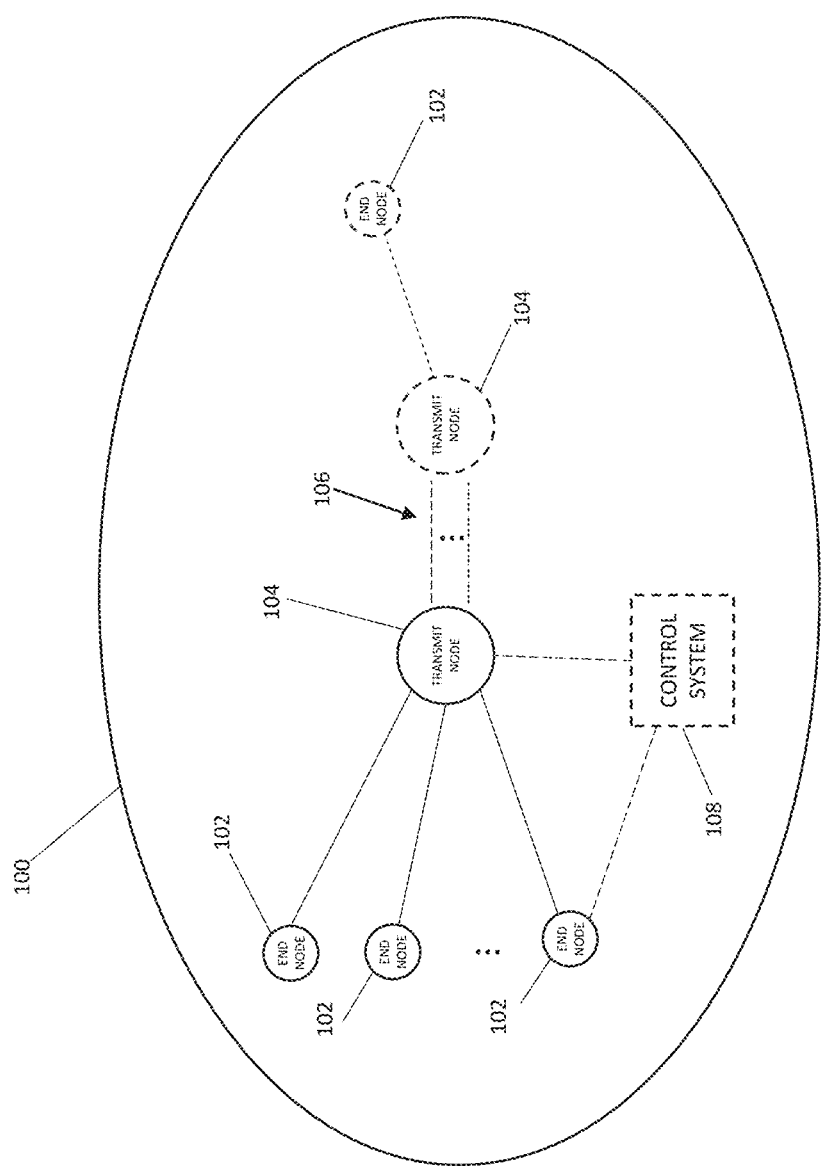
FIG. 1 illustrates an exemplary data communication network.

Described herein are examples of systems and methods for optimizing data communication in a data communication network in which requests to utilize a data communication pathway exceed one or more capacities (e.g., a maximum data transmission rate) of the pathway. Requests to transmit data via the communication pathway are received at a computing system. The requests include one or more demands for transmitting the data via the communication pathway. The computing system determines a set of the requests to accept such that an aggregate of the demands will not exceed one or more capacities of the communication pathway. In determining the set of requests to accept, the computing system seeks to maximize at least one attribute of the operation of the data communication network within a suitable tolerance that enables solutions to be determined in a computationally efficient manner. For example, the systems and methods may seek to maximize an aggregate data transmission rate or may seek to ensure that higher priority data is preferential.

According to various aspects, systems and methods described herein may determine which requests to accept by representing the selection problem as a binary knapsack packing problem that seeks to fill one or more knapsacks to the extent possible without exceeding the communication pathway capacity, while also seeking to maximize at least one attribute of the operation of the data communication network. In some examples, a maximum-value-density optimization approach is used to "fill" the knapsack(s). A value density may be defined as a value associated with a request divided by the demand for the request. If the maximum-value-density optimization selects a set of requests to accept that still leaves some residual capacity of the communication pathway, which may be unacceptably large for some applications, then maximum-value optimization steps may be used.

The maximum-value-density optimization may include first selecting a set of candidate requests that have the highest value densities such that an aggregate of the demands of those candidate requests does not exceed the capacity of the communication pathway. This may be followed by determining a non-selected request (X) that has a demand that can fit within the residual capacity, and determining if there exists a non-selected request (Y) that has a higher value density than the value density of the combined non-selected request X and the selected request (Z) that has the lowest value density of all of the selected requests. If none exists, then the non-selected request X is added to the list of requests selected for acceptance. If the non-selected request Y does exist and its demand is no larger than the sum of the residual capacity and the demand of the selected request Z, then the lowest value-density selected request Z is replaced by the non-selected request Y. The process may be repeated until no further reduction in residual capacity in the prescribed manner is possible.

Maximum-value optimization may be used if the above maximum-value-density optimization leaves some residual capacity of the communication pathway that may be unacceptably large for some applications. Starting with the maximum-value-density solution described above, the maximum-value optimization may include replacing selected requests with one or more non-selected requests such that the total value associated with the selected requests is increased. The value can be a fee that the requestors are willing to pay for their requests to be accepted, a priority associated with each request, etc. Increasing the total value can include determining if a non-selected request can replace several smaller selected requests to improve the total value with smallest degradation in average density. Additionally, or alternatively, increasing the total value can include determining if a non-selected request can replace a single selected request to increase the total value with the smallest degradation in average density.

According to an aspect, systems and methods may be configured to determine an optimal set of requests to accept where the requests include demands for multiple different capabilities of the communication pathway, such as multiple communication channels that each have their own capacities. The systems and methods may take a multiple-knapsack packing problem approach in which, given a population of n requests, each request being represented by m demands (correspond to the m capabilities of the communication pathway), among the n requests, select the subset of requests that packs all m knapsacks as close to their limits as possible. This optimization problem seeks to minimize the aggregate residual space in all knapsacks.

The multiple knapsack packing problem can be optimized by first selecting a set of candidate requests that, in aggregate, satisfy all constraints. Then, non-selected requests are found that fit within the residuals of the constraints. Non-selected requests that fit within the residuals of the constraints are selected that minimize the residual space. If sufficient residual space remains, then a determination is made whether each non-selected request can replace one single previously selected request for maximum reduction in the residual space and/or a determination is made whether each selected request can be replaced by one single previously non-selected request for maximum reduction in the residual space.

The systems and methods described herein can improve a data communication network by optimizing the selection of requests for data transmission to accept for a given communication pathway to maximize one or more attributes of the operation of the data communication network such that an aggregate of the demands by the accepted requests on network resources will not exceed one or more capacities of the communication pathway. This can ensure, for example, that the aggregate data transmission rate is maximized or that higher priority data transmission requests are accepted preferentially over lower priority data transmission requests while guaranteeing that an aggregate of the demands on network resources by the accepted requests will not exceed one or more capacities of the communication pathway. The techniques described herein can optimize request selection without incurring excessive computational penalties such that a solution for which requests to select can be reached in a timely manner (e.g., in real time).

In the following description of the various examples, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general-purpose computer selectively activated or reconfigured by a computer program stored in the computer or on a remote server. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing distinct functions or for increased computing capability. Suitable processors include central processing units (CPUs), graphical processing units (GPUs), field programmable gate arrays (FPGAs), quantum processing units (QPUs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an exemplary data communication network 100. The data communication network 100 can be a satellite communications network, a cellular communications network, a wired communications network, or a combination of any of these. The network 100 includes a plurality of end nodes 102 that can each be data sources and/or data sinks. The end nodes 102 can be any computing device that is a source of data for transmission over the network 100 and/or a consumer of data transmitted over the network 100 (i.e., a node can be only a source, only a consumer, or both a source and consumer of data). End nodes 102 can include, for example, consumer, commercial, industrial, and/or governmental computing systems. End nodes 102 can include user devices such as smartphones, sensor systems, server systems, unmanned vehicles, and any other computing system that can transmit and/or receive data via the network 100.

Network 100 includes a plurality of data transmission nodes 104 that handle data transmission between the end nodes 102. The data transmission nodes 104 can include, for example, routers, satellites, cellular tower nodes, etc. A data transmission node 104 may be communicatively connected to at least one other data transmission node 104 via one or more links 106 for transmitting data to and/or receiving data from the at least one other data transmission node 104. In some embodiments, a data transmission node 104 handles communication between end nodes 102 connected directly to it (i.e., without any other data transmission nodes 104). At least some of the data transmission nodes 104 are connected to at least one end node 102 for transmitting data to and/or receiving data from the at least one end node 102. Optionally, one or more control computing systems 108 may be connected to one or more of the data transmission nodes for controlling at least some aspects of how data is to be transmitted by a data transmission node.

The end nodes 102 may transmit data to a connected transmission node 104 for sending the data to another end node 102 via a suitable transmission path through the transmission nodes 104. To initiate data transmission, an end node 102 may transmit a request to a connected transmission node 104 to transmit data via the transmission node 104. A given transmission node 104 may receive transmission requests from any number of connected end nodes 102 and/or other transmission nodes 104. A transmission node 104 and/or a link 106 from one transmission node 104 to another may have one or more data transmission capacity constraints. For example, a router may have a maximum data rate throughput, a satellite communication link may have maximum uplink and downlink data rates, or a cellular tower node may have one or more communication channels having maximum data rate capacities. A given data transmission node 104 may have multiple different data transmission capacity constraints. For example, a data transmission node 104 may have different maximum data transmission rates for different types of data, such as different maximum data rates for voice, video, text, command and control messages, system overhead messages, etc.

Figure 2:
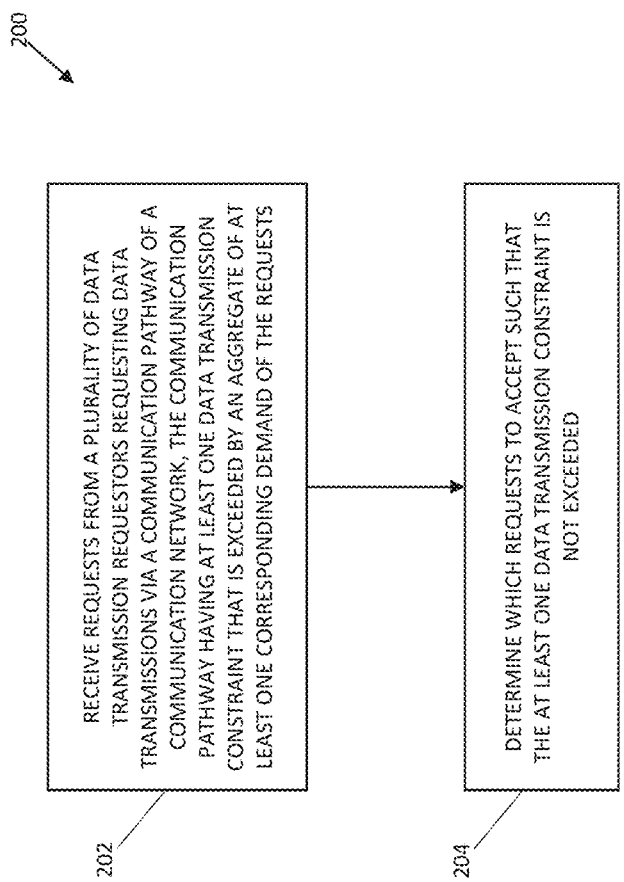
FIG. 2 is a flow diagram of an exemplary method for determining requests for data transmission via a data communication pathway of the data communication network to accept where an aggregate of demands of the requests exceeds at least one constraint of the data communication pathway.

The capacity constraints of a given transmission node 104 may be such that the node 104 cannot fulfill all of the requests for data transmission from the end nodes 102. FIG. 2 is a flow diagram of an exemplary method 200 for determining which data transmission requests to accept and which to reject. Method 200 may be performed by any suitable computing system. For example, method 200 may be performed by one or more of the transmission nodes 104 for the respective transmission node 104 to select which data transmission requests from among the requests it receives that it is going to accept. Alternative or additionally, method 200 may be performed by a computing system communicatively coupled to a transmission node 104, such as a control computing system 108 of FIG. 1. In such instances, control computing system 108 may receive information (such as information corresponding to data transmission requests from the connected end nodes 102) from a connected transmission node 104 and/or one or more end nodes 102 connected to the control computing system 108, may determine which data transmission requests the transmission node 104 should accept, and may transmit information to the transmission node 104 indicating which data transmission requests to accept. Any combination of steps of method 200 may be performed by any combination of computing systems, including any combination of a transmission node 104 and a control computing system 108.

At step 202, a plurality of requests from a plurality of data transmission requestors requesting data transmissions via a communication pathway (e.g., a data transmission node 104 and/or one or more links 106) of a communication network are received at a computing system. The requestors may be, for example, at least some of the end nodes 102 communicatively connected to the transmission node 104. The requests may be received at the transmission node 104. Alternatively, the requests may be received at a control computing system 108 from the end nodes 102, e.g., directly or via transmission node 104. The received requests include requests for data transmissions via a communication pathway that includes the transmission node 104. For example, a request may be to transmit data from the requestor through the transmission node 104. A request may include requesting that data be transmitted via one or more communication channels associated with the transmission node 104 and/or that data be transmitted via one or more links 106 associated with the transmission node 104.

The communication pathway that is being requested by the requestors to be used for transmitting data has at least one data transmission constraint. The data transmission constraint can include, for example, a data transmission rate limit. The data transmission rate limit may be a limit of the transmission rate of data being transmitted across all accepted requests. In other words, the constraint is not a per-requestor limit, but rather a limit that applies to a set of accepted requests. There may be more than one constraint that applies to the communication pathway. For example, there can be different constraints for different types of data being transmitted via the communication pathway. An example includes a first data transmission limit for video data transmission and a second data transmission limit for voice data transmission.

At least one data transmission constraint associated with the communication pathway may be exceeded by an aggregate of at least one demand of the requests for data transmission by the requestors. For example, each request may include a demand for a specified data transmission rate or a specified amount of data to be transmitted within a requested period of time and an aggregate of the demands for the data transmission rates and/or data per unit time from the requestors may exceed a data rate capability of the transmission node 104. In other words, the data transmission demand aggregated across the requests exceeds a capability of the communication pathway (e.g., the data transmission rate capability of the transmission node 104). Therefore, all of the requests cannot be accepted and at least one request will have to be denied.

Requests can have multiple demands. For example, the transmission node 104 may be a satellite and the requests can include an uplink demand (e.g., an amount of data or a data rate to be transmitted via the satellite uplink) and a downlink demand (e.g., an amount of data or a data rate to be transmitted via the satellite uplink). The satellite may include an uplink constraint and a downlink constraint (e.g., a maximum of data to be handled over a certain period or a maximum data rate). These constraints may be the same or different. Another example of multiple demands is multiple data communication rate demands for different data types, such as different communication rate demands for one or more of voice, video, audio, text, images, command and control messages, system overhead messages, etc. The communication node 104 (e.g., a communication node in a 5G network) may have different data rate capacities for the different data types.

At step 204, the computing system determines which requests to accept such that the at least one data transmission constraint is not exceeded. The determination of which requests to accept may be based on one or more factors. In some embodiments, a factor that is used for determining which requests to accept includes at least one value associated with at least one characteristic of each of the requests. An example of a characteristic that can be used for determining which requests to accept is a price a given requestor is willing to pay for their data transmission. For example, requestors may have agreements with an operator that controls transmission node 104 (e.g., a network provider) to pay certain prices for use of the communication pathway, such as a subscription fee, which may or may not be tied to a specific data transmission rate, or a price per unit data. Requestors (or their requests) may be associated with different agreed upon prices, and this difference can be leveraged in method 200 to select requests in such a way as to maximize revenue. Optionally, a value associated with at least one characteristic of a request may be a value associated with honoring the request. So, for example, where a requester agrees to pay a certain fee per unit data, the associated value may be a product of the fee per unit data and the total amount of data associated with the request. As such, step 204 may determine which requests to accept by seeking to maximize an aggregate value while ensuring that the at least one data transmission constraint is not exceeded.

Another example of a characteristic that can be used for determining which requests to accept is a priority. Different requestors or different requests may have different priorities associated with them and a selection of requests to accept can be made that maximizes some metric associated with priority. An example of different requestors and/or different requests having different priorities is a governmental organization having a higher priority than a consumer or text data transmission having higher priority than video data transmission. Any suitable scale for values associated with a priority characteristic may be used. For example, a low priority request may be assigned a value of one, a medium priority request may be assigned a value of two, and a high priority request may be assigned a value of three.

Requests may have multiple different characteristics that may be used in determining the selection of which requests to select. For example, requests can be associated with agreed upon prices to be paid for data transmission and with priorities. Values for one or more characteristics of requests may be provided in the requests themselves received at the computing system from the requestors or may be pre-stored in the computing system. For example, each request may include a price per data transmission rate that the given requestor is willing to pay or the computing system may access a pre-stored (e.g., stored locally or stored in a remote database) price per data transmission rate that the given requestor is willing to pay and may associate that pre-stored price with the request based on an identity of the requestor associated with the request.

Another factor that may be used for determining which requests to accept includes the capabilities of the communication pathway for which demands are made by the requests. Requests may be selected to maximize the utilization of the communication pathway. For example, where the communication pathway has a maximum data transmission rate capacity, step 204 may include selecting a set of requests that, in sum, have the highest data transmission rate demand, without exceeding the capacity of the communication pathway.

Determining which requests to accept such that the at least one data transmission constraint is not exceeded may include seeking to maximize a value-density of one or more of the characteristics associated with the requests. The value-density for a given request may be a function of a value associated with at least one characteristic for the request and at least one demand of the respective request. As an example, the value-density for a given characteristic and demand of a request may be defined as the value associated with the characteristic divided by the demand. For example, where the request is associated with a fee to be paid for a certain data rate and the demand is for a certain data rate, the value-density is given as:

$$\text{value density} = \frac{\text{data rate fee}}{\text{demanded data rate}}$$

Determining which requests to accept, according to step 204, may include seeking to maximize the combined value density of the accepted requests (as used herein, the combined value density of a set of requests is the sum of all values of the set of requests divided by the sum of all demands of the set of requests) subject to the constraints that the sum of data rate demands across all accepted requests cannot exceed the capacity of the associated transmission node 104. This maximization of the combined value density is referred to herein as the maximum-value-density.

Determining an absolute maximum-value-density given a set of requests may be computationally burdensome and, thus, may not be solvable for a complex network within the time frame needed for a solution. As such, step 204 may include a process for reaching an approximate maximum-value-density that is less computationally intensive, and thus, usable in complex communication networks for selecting which requests to accept as needed (e.g., in real-time).

Figure 3:
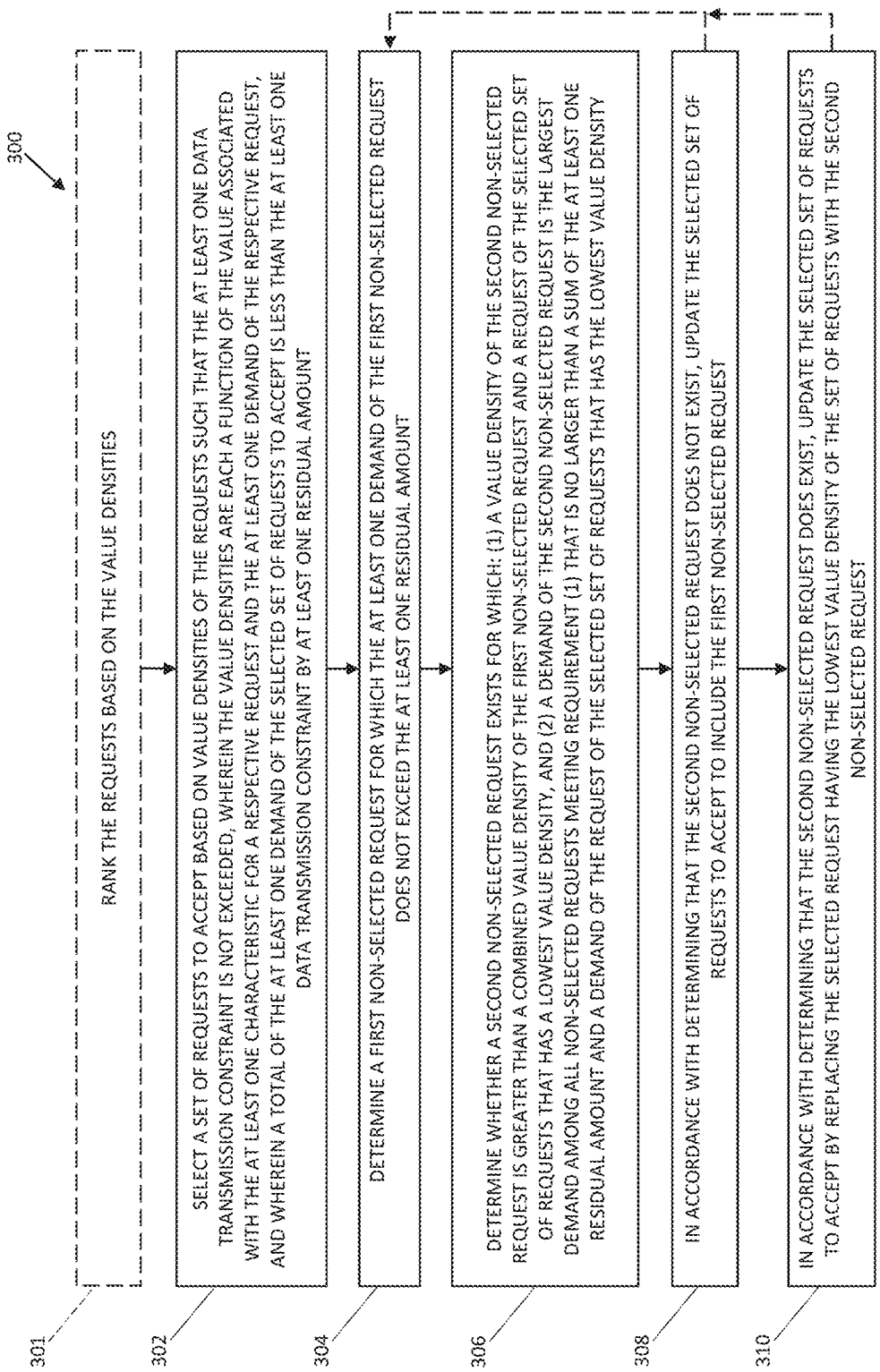
FIG. 3 is an exemplary implementation of one or more steps of the method of FIG. 2.

FIG. 3 illustrates an exemplary method 300 for implementing step 204 of method 200. At step 302, an initial selection is made of a set of candidate requests to accept based on value densities of the requests. This initial selection is made such that the data transmission constraint (or constraints) is not exceeded. Further, the initial selection is made such that a total of at least one demand of the initial selection of candidate requests to accept is less than the at least one data transmission constraint by at least one residual amount. In other words, the total demand across the set of requests in the initial selection does not exceed the data transmission constraint (or constraints) and may be less than the data transmission constraint, with the difference being a residual amount. The initial selection may be made, for example, by determining, at optional step 301, the value density of the requests and ranking the requests based on value density. Then, step 302 can include selecting the requests in descending value density order until no further selection of a request can be made without exceeding the data transmission constraint.

At step 304, a determination is made of a first non-selected request (i.e., a request that is not in the initial selection) that has a demand that does not exceed the residual amount. For example, where the residual amount is a data rate of 10 data units per period of time, a non-selected request having a data rate demand for 8 data units per period of time may be selected in step 304 but not a non-selected request having a data rate demand for 11 data units per period of time. This step may include selecting the request that has the greatest demand that does not exceed the residual amount or may include selecting any request that has a demand that does not exceed the residual amount. Optionally, determining the first non-selected request may include searching along the ranking of the requests from step 302 (only those requests that are not in the initial selection) in descending order until a request is located that has a demand that does not exceed the residual.

At step 306, a determination is made of a second non-selected request (i.e., another request that is not in the initial selection) for which: (1) a value density of the second non-selected request is greater than a combined value density of the first non-selected request and a request of the initial selection of requests that has a lowest value density, and (2) the demand of the second non-selected request is the largest demand among all non-selected requests meeting requirement (1) that is no larger than the sum of the residual amount and the demand of the lowest value-density request from the initial selection. This step includes searching the set of non-selected requests for a non-selected request that meets these requirements. For example, where the first non-selected request from step 304 has a value of $V_1$ and a demand of $D_1$ and the lowest value-density request from the initial selection of requests from step 302 has a value of $V_2$ and a demand of $D_2$, non-selected requests are identified that have a value density greater than:

$$\frac{V_1 + V_2}{D_1 + D_2}$$

The non-selected requests that meet this requirement (requirement (1) above) are then compared to determine which of the non-selected requests has the largest demand that is no larger than the sum of the residual amount and the demand ($D_2$) of the lowest value-density request from the initial selection. This step may include searching along the ranking of the requests from step 302 (only those requests that are not in the initial selection) in descending order until a request is located that meets the requirements outlined above. If step 306 cannot identify a second non-selected request that satisfies the requirements described above, then the initial selection of requests to be accepted is updated to include the first non-selected request at step 308, and the method may return to step 304.

If step 306 can identify a second non-selected request that satisfies the requirements described above then, at step 310, the selection of requests to accept is updated from the initial selection to an updated selection by replacing the request having the lowest value density in the initial selection with the second non-selected request. Steps 304-310 may be repeated until no further replacements or additional acceptances can be made. Optionally, once this point is reached, the final selection of requests to accept has been determined. The transmission node 104 may accept the requests in the final selection—i.e., the transmission nodes may transmit data as demanded in the requests that are in the final selection of requests to be accepted.

Optionally, step 204 of method 200 can include additional steps that seek to further maximize total value. In one such optional step, a determination is made whether multiple (i.e., at least two) lower demand requests in the updated selection from step 310 (after any number of loops of steps 304-310) can be replaced by a non-selected request to improve the total value of the set of selected requests with a smallest degradation in average value density of the set of selected requests. The computational penalty associated with this step when the number of requests is high may be too great to justify the improvement in performance. As such, this step may be performed only when the number of requests is equal to and/or below a threshold value. An exemplary threshold value is 50 requests.

Another optional step, which may be performed after or instead of the above optional step, includes determining whether a single previously selected request (a request in the updated selection of requests from step 310, e.g., starting from the lowest demand request) can be replaced by a single non-selected request to improve the total value with smallest degradation in average value-density. The computational penalty associated with this optional step may not be justified when there is a high number of requests. As such, it may only be performed when the number of requests is at and/or below a threshold value, which can be the same threshold as the optional step above or a different threshold. An example, of a threshold is 500 requests.

FIGS. 4A-E are flow diagrams illustrating an exemplary method 400 implementing the steps described above (i.e., an example implementation of method 300). At step 402, the requests are sorted in order of descending value density. If requests have the same value density, then those requests may be sorted in order of descending demand. This step may be preceded by a step of determining the value densities for each request. At the end of step 402, the requests may be sorted in order of descending value densities (those requests that have the same value density may be sorted in order of descending demands). At step 404, the first k requests (starting from the top of the sorted requests and moving in descending order) are selected such that the sum of the demands (m) of the selected requests are less than the corresponding constraint of the communication pathway (M) and adding the k+1 request to the selection would exceed the constraint. This step results in a residual that is the sum of the demands of the selected requests subtracted from the value of the constraint (M).

Figures 4A, 4B:
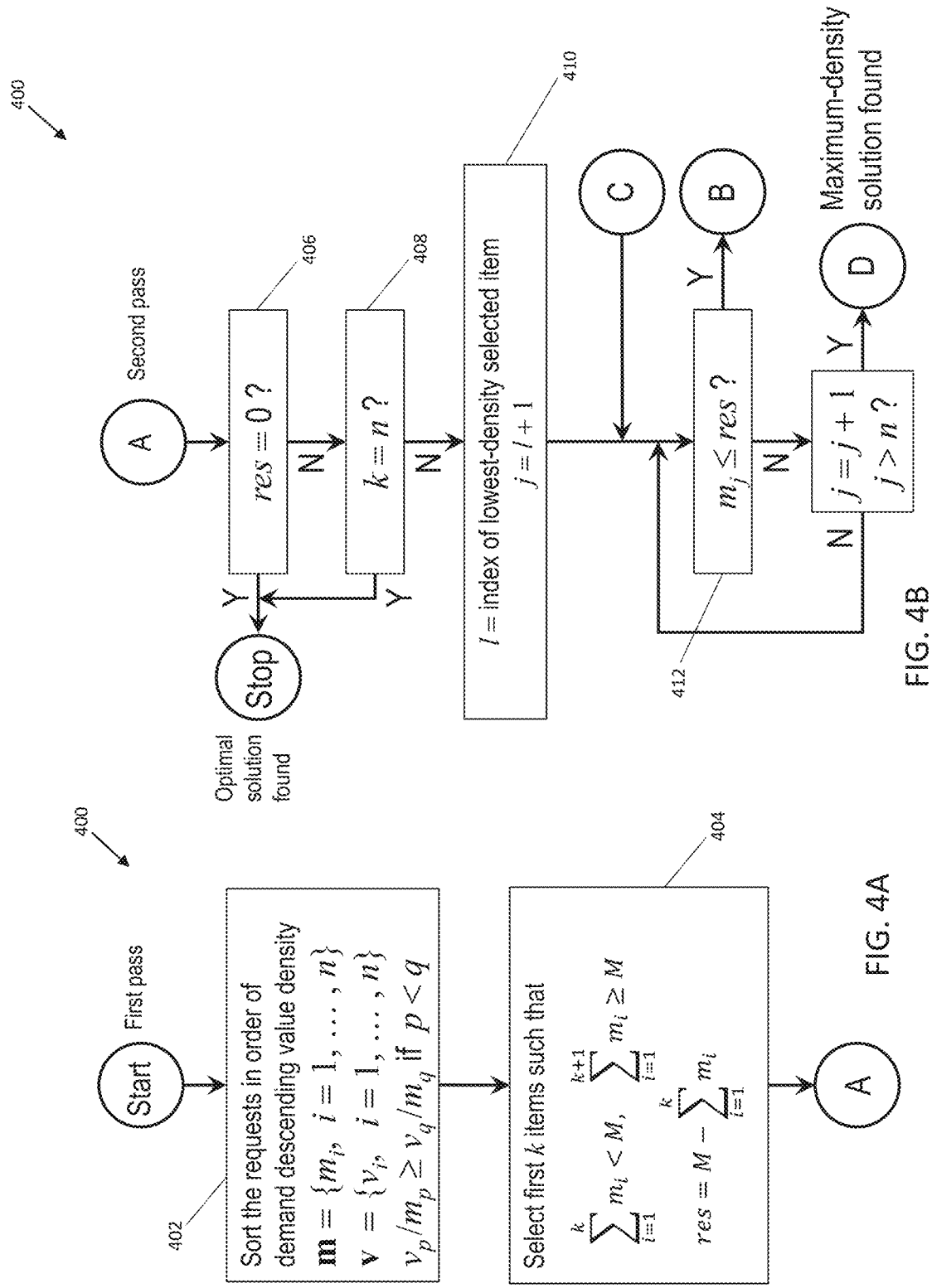
FIGS. 4A-E are flow diagrams of an exemplary method for implementing one or more steps of the method of FIG. 3.

Looking at FIG. 4B, at step 406, a determination is made whether the residual is zero. If it is, then the selected requests from step 404 is the optimal set of requests and the requests in the set may be accepted by the communication node 104. If the residual is not zero, then at step 408, a determination is made whether the selected set of requests from step 404 includes all of the requests that were received. If so, then all the requests may be accepted. If not, then at step 410, the highest value-density request of the non-selected requests (the requests not selected in step 404) is determined. This is represented in FIG. 4A as selecting the request that is immediately below (in the ordered list from step 402) the lowest value-density request in the selected requests from step 404. At step 412, a determination is made whether the demand $m_j$ of the non-selected request identified in step 410 (or step 416 or step 418, depending on the stage of the process as discussed further below), exceeds the residual determined in step 404 (or step 416 or step 418, depending on the stage of the process). If it does, then the next lower value-density non-selected requests are checked until one is found that does not exceed the residual (i.e., step 412 is repeated). If all non-selected requests have been analyzed according to step 412 and all have been found to have demands in excess of the residual, then the method may proceed to step 420 shown in FIG. 4D and described further below.

Figure 4C:
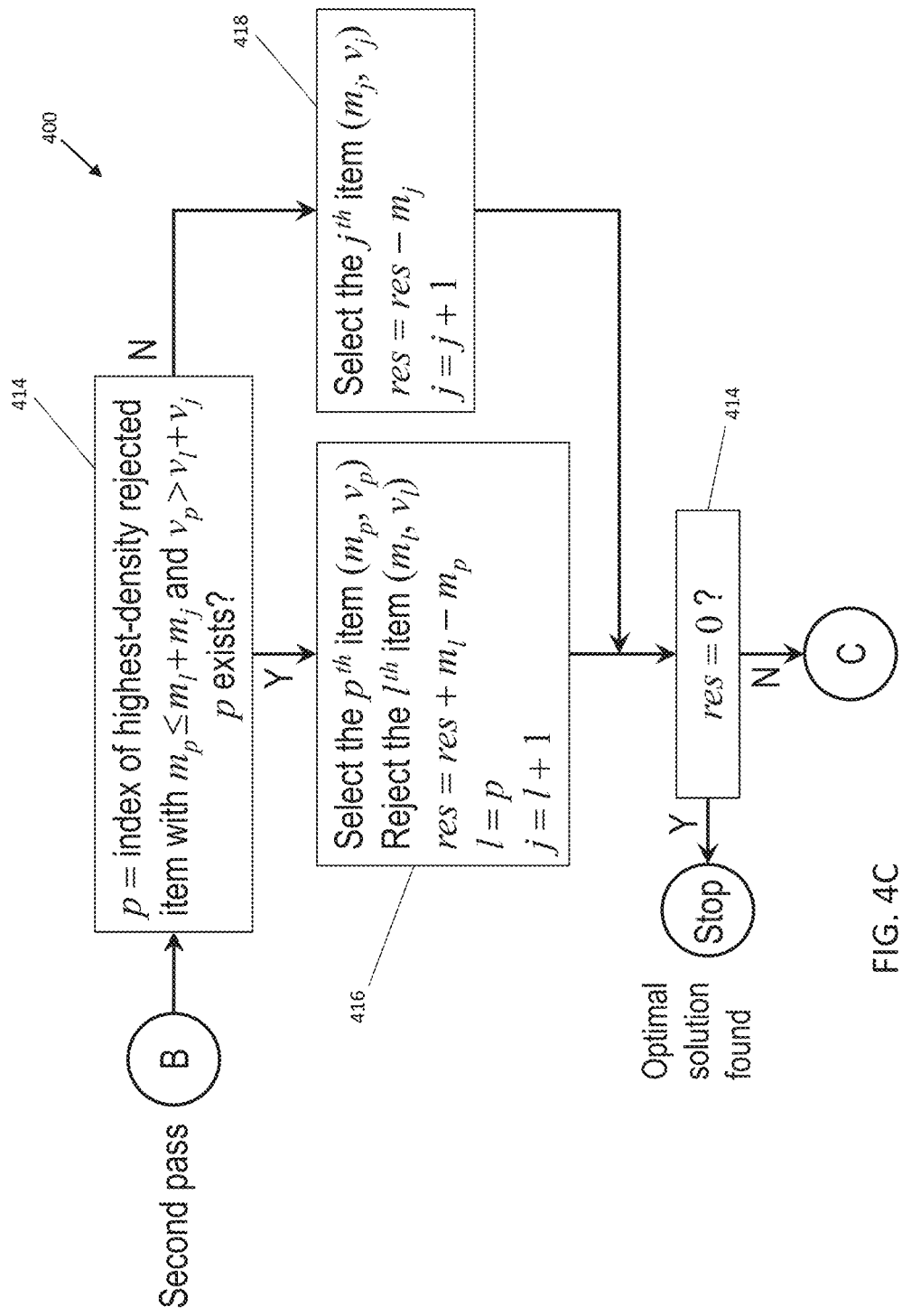

If there is a non-selected request that does not exceed the residual, as determined in step 412 (the demand of which may be designated $m_j$), a determination is made at step 414 of FIG. 4C whether there is a non-selected request (a request not in the selected requests from step 404 (or step 416 or step 418, depending on the stage of the process)) that has a demand that does not exceed the sum of the demand ($m_j$) of the request determined at step 412 and the demand ($m_i$) of the lowest value-density request determined at step 410 (or step 416 or step 418, depending on the stage of the process), and has a value that exceeds the sum of the value ($v_j$) of the request determined at step 412 (or step 416 or step 418, depending on the stage of the process) and the value ($v_i$) of the lowest value-density request in the selected requests determined from either step 410 (or step 416 or step 418, depending on the stage of the process). If there are multiple requests that meet this requirement, then the request with the highest value-density is selected. At step 416, the list of selected requests is updated by replacing the lowest value-density selected request (i.e., the request with demand mi and value vi) with the request determined in step 414. The residual, the lowest value-density selected request, and the highest value-density non-selected request are all updated at the end of step 416 after the lists of selected and non-selected requests have been updated. If no request is found that satisfies the requirement in step 414, then at step 418 the list of selected requests is updated to include the request determined at step 412 (i.e., with demand $m_j$ and value $v_j$). The residual, the lowest value-density selected request and the highest value-density non-selected request are all updated at the end of step 418 after the lists of selected and non-selected requests have been updated. Following steps 416 and 418, if the residual after adding the request according to step 416 or 418 to the selected set is zero, then the method may end, resulting in the updated list from either step 416 or step 418 being the final list of requests to accept. If there is still a residual after step 416 or step 418, then the method may return to step 412 of FIG. 4B.

Figure 4D:
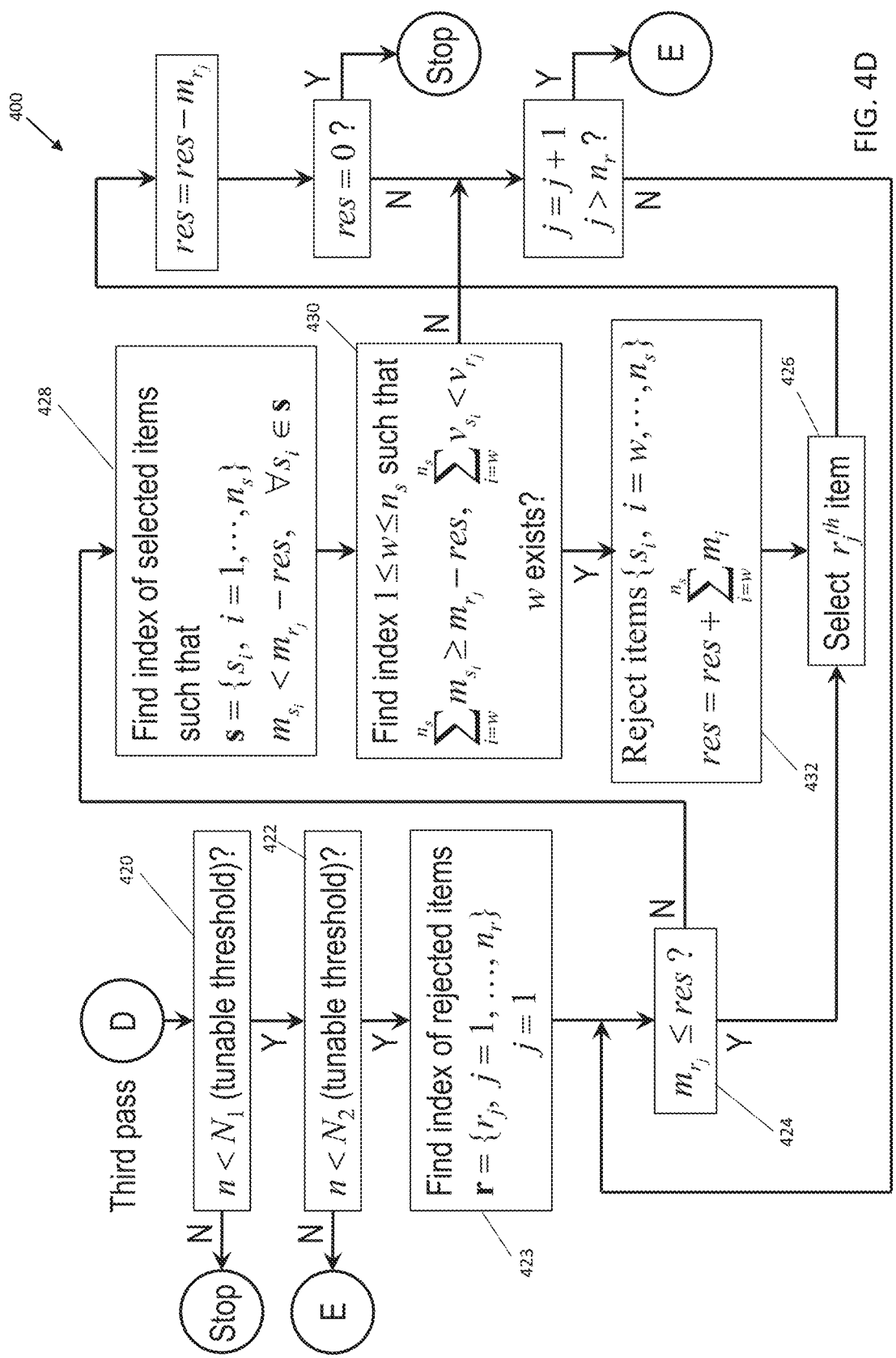

Turning to step 420 of FIG. 4D, a determination can be made whether the total number of requests is below a predefined threshold (e.g., 25, 50, 75, 100, 1000, etc.). If it is not below the threshold, then the method may end, resulting in the updated list from the preceding steps being the final list of requests to accept. The threshold may be associated with a number of requests above which subsequent steps may impose too high a computational penalty to justify the likely improvement in results. The total number of requests can be compared to a second predetermined threshold at step 422. This threshold may be lower than the threshold of step 420 and may be associated with a number of requests above which a portion of subsequent steps may impose too high a computational penalty to justify the likely improvement in results from those steps. If the number of requests is not below the second threshold, then method 400 may proceed to step 434 of FIG. 4E, which is described further below.

If the number of requests is below the second threshold at step 422, then at step 423, the set of requests not in the updated list of selected requests from the preceding steps (i.e., an updated list of non-selected requests) is determined. At step 424, a request from the set determined at step 423 is analyzed and its demand is compared to the residual corresponding to the updated set of selected requests. If its demand is less than the residual, then it is added to the updated list of selected requests at step 426. If this results in the residual being zero, then the method may end, resulting in the updated list from step 426 being the final list of requests to accept. If there is still some residual and not all requests of the set from step 423 have been analyzed, then the method may return to step 424 for analysis of a different request from the set determined at step 423. If there is still some residual after all requests in the set from step 423 have been analyzed, then method 400 may proceed to step 434 of FIG. 4E, which is described further below.

If the demand of the request from step 424 is larger than the residual, then at step 428, the updated list of selected requests from the preceding steps is searched for selected requests that have demands that are less than the demand of the request from step 424 less the residual. At step 430, a subset of these requests is found where the sum of their demands is greater than the demand of the request from step 424 less the residual and the sum of their values is less than the value of the request from step 424. If such a subset (which can be a subset that has one or more than one requests) exists, then at step 432, the subset of requests is removed from the updated list of requests to accept from the preceding steps, and at step 426, the request from step 424 is added to the list of requests to accept. If, however, such a subset does not exist (step 430) and not all requests of the set from step 423 have been analyzed, then the method may return to step 424 for analysis of a different request from the set determined at step 423.

Figure 4E:
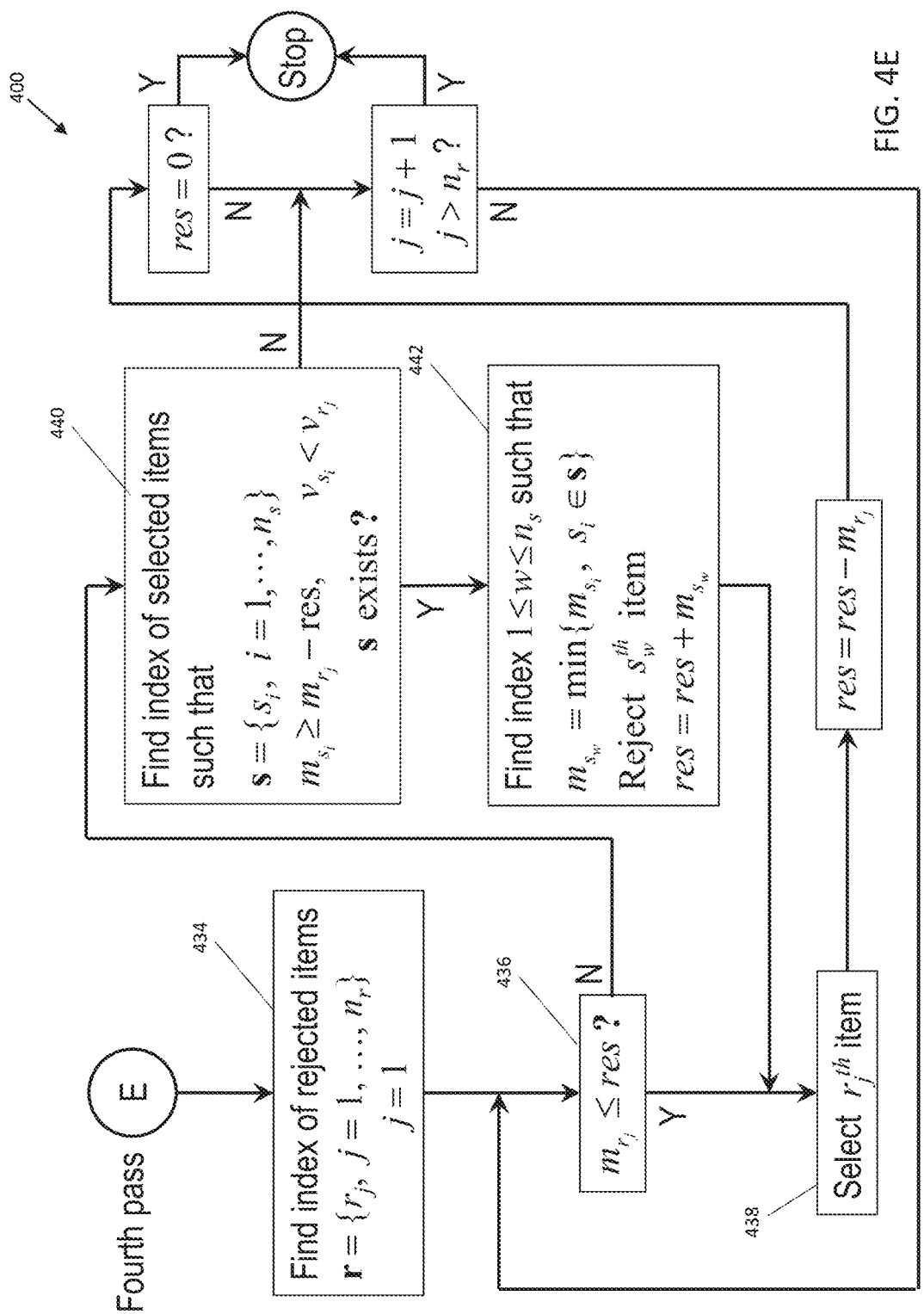

Once all of the requests of the set from step 423 have been analyzed according to step 424-432, then the method continue with step 434 shown in FIG. 4E. At step 434, the set of requests that are not in the updated list of selected requests from previous steps (i.e., an updated list of non-selected requests) is determined. At step 436, one of the requests from the set determined in step 434 is analyzed and its demand is compared to the residual corresponding to the updated list of selected requests from previous steps. If its demand is less than or equal to the residual, then at step 438, the list of requests to accept is updated to include the request. If this reduces the residual to zero, then the method ends, and the updated list may be used as the final set of requests to accept. If there is still some remaining residual and all of the requests from the set identified in step 434 have not been analyzed, the method may return to step 436 for analysis of a different request from the set of requests identified in step 434. If the demand of the request is larger than the residual at step 436, then at step 440, a set of requests in the updated set of selected requests is determined for which each request in the set have a demand that is greater than or equal to the demand of the request identified at step 436 less the residual associated with the updated set of selected requests and have a value that is less than the value of the request identified at step 436. If no such requests exist and not all requests of the set of requests from step 434 have been analyzed, then the method may return to step 436 for analysis of a different request from the set of requests determined at step 434. Returning to step 440, if a set (of one or more requests) satisfying the requirements of step 440 can be formed, then at step 442, the request having the minimum demand in the set of requests is removed from the updated list of selected requests, and the method proceeds to step 438 in which the request identified in step 436 is added to the updated list of requests to accept. If this reduces the residual to zero, then the method ends, and the updated list may be used as the final set of requests to accept. If there is still some remaining residual and all of the requests from the set identified in step 434 have not been analyzed, the method may return to step 436 for analysis of a different request from the set of requests identified in step 434.

Method 400 takes an approach of packing a single knapsack to maximize the value of the selected set of data communication requests. According to method 400, the knapsack limit can be, for example, a communication channel capacity and the value that is maximized may be, for example, an aggregate users' subscription fee, users' priority, etc. In some applications, a data communication pathway may include multiple different communication capabilities having corresponding constraints and data transmission requests may include demands that correspond to the multiple capabilities of the communication pathway, with at least some of the constraints being exceeded by an aggregate of the demands of the requests. Described further below are methods for determining which requests to accept where the communication pathway has multiple capabilities for which the requests have corresponding demands that, in aggregate, exceed the upper limit of at least one of the capabilities.

Generally, given a population of n requests, each request being represented by m attributes (demands for respective capabilities of the communication pathway), the problem can be thought of as having m knapsacks representing the m attributes of the requests. Among n requests, choose the subset of requests that packs all m knapsacks as close to their limits as possible (or some approximation of this). This is an optimization problem that seeks to minimize the aggregate residual space in all knapsacks.

In the example of a satellite communication link having an uplink (UL) data rate capacity and a downlink (DL) data rate capacity, requests may be selected such that the aggregate of the data rate demands (UL and DL) are maximized (or approximately maximized) subject to the capacity limits. This can be represented as:

$$\max_x \sum_{j=1}^{n}(u_j + d_j)x_j \text{ subject to } \sum_{j=1}^{n}u_j x_j \le U \text{ and } \sum_{j=1}^{n}d_j x_j \le D$$

where $u_j$ and $d_j$ are, respectively, the uplink and downlink data rate demands corresponding to the $j^{th}$ request, U and L are, respectively, the uplink and downlink capacities (e.g., maximum data rates) of the satellite communication link, and $x_j$ is the binary selection variable (which is 1 if the corresponding request is selected and 0 if not).

The above is an example of a communication pathway that has two constraints. A communication pathway may have more than two constraints. For example, a communication network such as a 5G communication network may transport different types of data (e.g., voice, video, text, housekeeping, command/control, etc.) over different dedicated channels, also known as slices, of a given data transmission node, and each channel (or slice) may have its own capacity. In this example, there are m types of data to be transported over m dedicated channels, with the channel for the $i^{th}$ data type having a maximum capacity (e.g., data transmission rate) $b_i$. For n data transmission requests, each having demands corresponding to one or more types of data to be transported over a given data transmission node, a set of requests is selected to maximize (or approximately maximize) data rates over all data types, subject to individual channel capacity limits, which can be represented as follows:

$$\max_x \sum_{i=1}^m a_i x \text{ subject to } 0 \le a_i x \le b_i, a_i = 1 \times n \text{ real}, i = 1, \ldots, m$$

where $a_i=[a_{ij}, j=1, \ldots, n]$, $a_{ij}$ is the demand (e.g., data transmission rate) of the $j^{th}$ request for the $i^{th}$ data type, and x is set of binary selection variables, $x=[x_j; j=1, \ldots, n]$ (i.e., $x_j=1$ ($j^{th}$ user is selected) or $x_j=0$ ($j^{th}$ user is rejected)). Each data type is packed into a knapsack and the system selects a subset of the n users to minimize the aggregate residual space in all knapsacks taken together.

Figure 5:
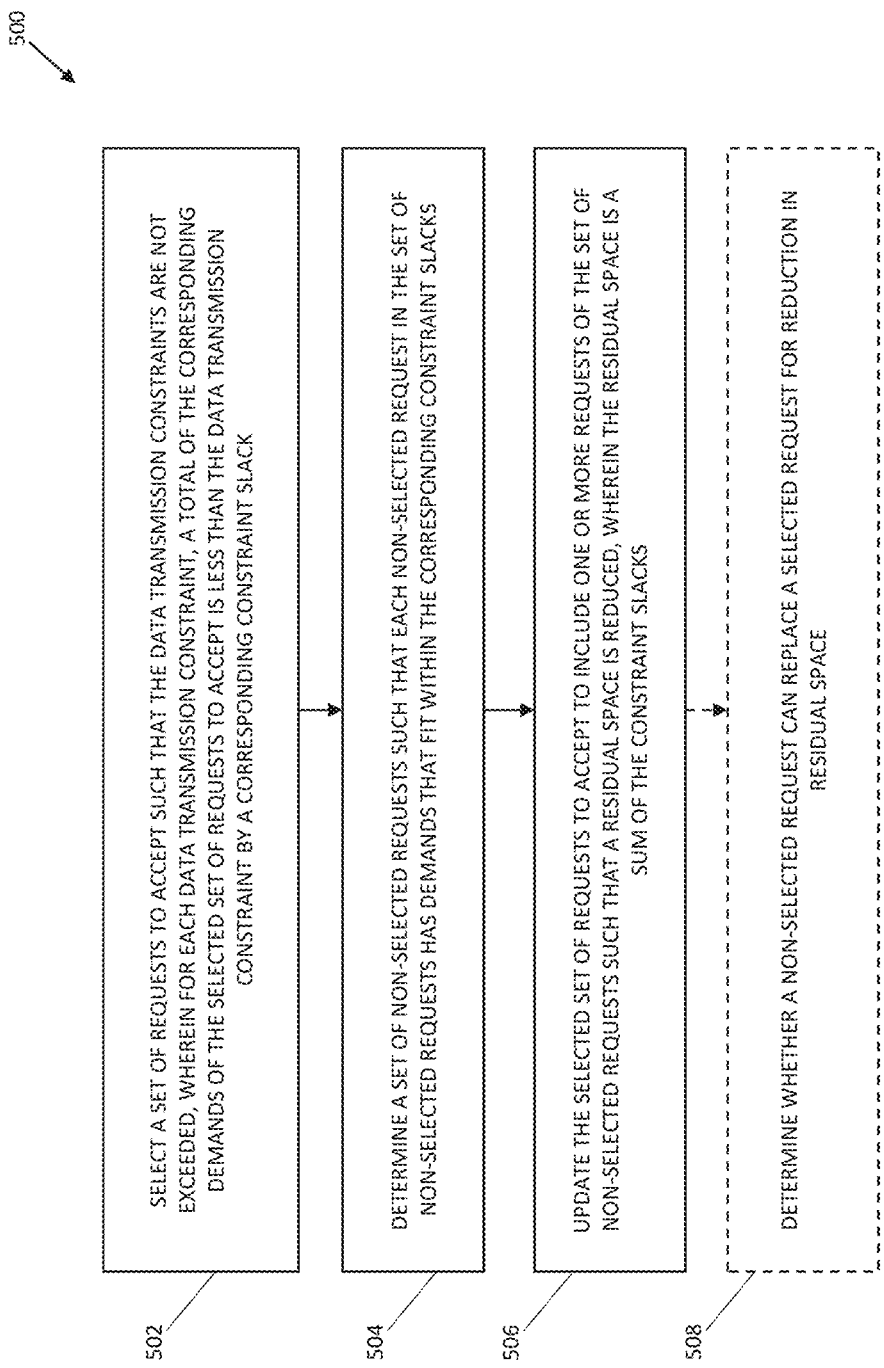
FIG. 5 is an exemplary implementation of one or more steps of the method of FIG. 2.

Determining the exact solution to the above maximization problems may be too computationally burdensome to be practically applied in real-time or near-real-time applications. FIG. 5 is a flow diagram of a method that can be used determine approximations of the above maximization problem, which may provide good performance with significantly lower computational burden. Method 500 may be used to implement step 204 of method 200 for an application in which the requests include demands for more than one capability of the communication pathway. Method 500 may be directed to solving a multiple knapsack packing problem, each knapsack being associated with a different capability of a communication pathway (e.g., an uplink versus a downlink of a satellite communication link or different data types in a 5G network).

At step 502, a set of requests to accept are selected such that the data transmission constraints are not exceeded, wherein for each data transmission constraint, a total of the corresponding demands of the selected set of requests to accept is less than the data transmission constraint by a corresponding constraint slack. The constraint slack for a given capability (e.g., a data transmission rate for a given data type) may be the residual for that capability. This step can include finding the largest index k such that:

$$\sum_{j=1}^k a_{ij} \le b_i, \forall i \le m$$

This approximation may include selecting the first k requests that in aggregate satisfy all constraints. k is selected such that inclusion of the $(k+1)^{th}$ request violates some constraint(s), i.e.:

$$\sum_{j=1}^{k+1} a_{ij} > b_i, \exists i \le m$$

Step 502 may be preceded by a request ordering step in which the requests are organized into some suitable order, such as being ordered in descending order according to one or more of their demands. Step 502 may then include selecting the first k requests in the ordered list.

At step 504, a set of non-selected requests is determined such that each non-selected request in the set has demands that fit within the corresponding constraint slacks for every constraint. This step can include determining the subset of requests rejected in the first pass (step 502) that fit within the constraint slack for every constraint (where, as noted above, a constraint slack for a given capability (e.g., a data transmission rate for a given data type) is the residual for that capability). This step includes looking beyond the $(k+1)^{th}$ request and select one or more requests within that subset to minimize the residual space with each selection. At step 506, the selected set of requests to accept is updated to include one or more requests of the set of non-selected requests such that a residual space is reduced, wherein the residual space is a sum of the constraint slacks. Step 506 may include updating the selected set of requests to accept such that the residual space is maximally reduced (e.g., reduced to the extent possible). Alternatively, step 506 may include updating the selected set of requests to accept such that the residual space is reduced by an amount that satisfied a threshold (e.g., a threshold percentage reduction).

Method 500 may include one or more optional steps for further optimization. In optional step 508, a determination is made whether a non-selected request can replace a selected request for reduction in residual space. This step may include, for one or more (e.g., each) request rejected by the end of step 506, determining if it can replace one single previously selected request for maximum reduction in the residual space, which for purposes of step 508 is the sum of the constraint slacks. Step 508 may be computationally intensive when there are a large number of requests. In such instances (e.g., when the number of requests is above a predetermined threshold), step 508 may be modified such that: (a) if there are more non-selected requests than selected requests, for every non-selected request, a determination is made whether the non-selected request can replace one of the selected requests for maximum reduction in the residual space; and (b) if there are more selected requests than non-selected requests, for each selected request, a determination is made whether the selected request can be replaced by one non-selected request for maximum reduction in the residual space.

Figure 6A:
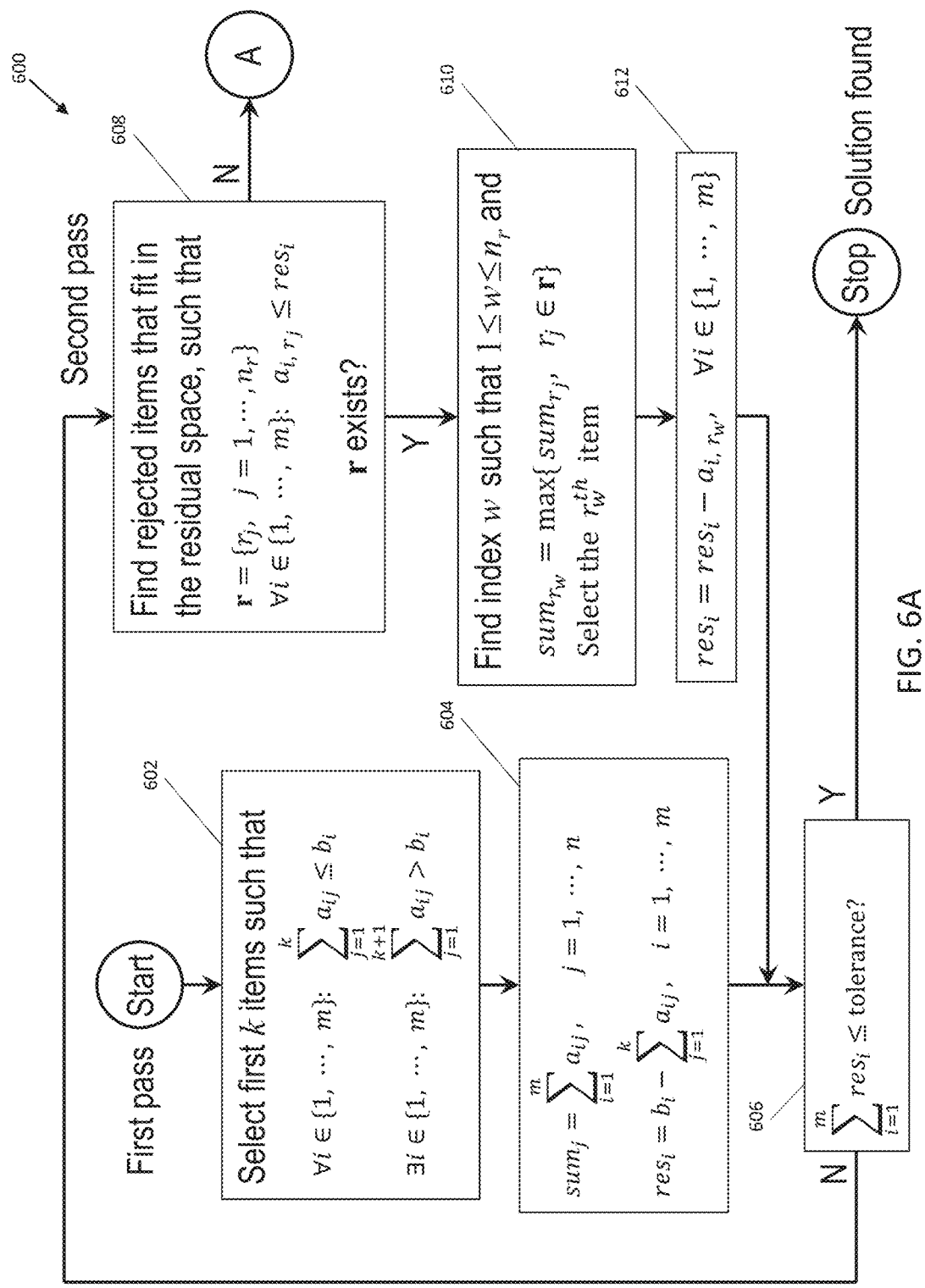
FIGS. 6A-C are flow diagrams of an exemplary method for implementing one or more steps of the method of FIG. 5.

FIG. 6 is a flow diagram of a method 600 that can be used as an exemplary implementation of method 500 of FIG. 5. At step 602, the first k requests are selected such that the sum of the demands of the selected requests are less than the constraints on the corresponding capability of the communication pathway, and the addition of a k+1 request would result in at least one of the constraints being exceeded. This set of k requests forms an initial set of requests to accept. Step 602 is an example of step 502 of method 500. At step 604, for each request, a sum of all the demands corresponding to the constraints is determined, $sum_j$ being designated the sum corresponding to the $j^{th}$ request, and a residual for each constraint, $res_i$ being designated the residual corresponding to the $i^{th}$ constraint, is determined (also referred to herein as the constraint slack) as: the difference between the constraint (e.g., maximum data transmission rate for a given data type) and the sum of the demands of the selected requests that correspond to that constraint (e.g., a sum of the demands for data transmission rates for the given data type).

At step 606, the sum of the residuals for the constraints is compared to a predetermined tolerance value, which can be used to terminate the process when the solution is sufficiently optimized. If the sum of the residuals is less than the predetermined tolerance value, then method 600 may end. If not, then at step 608, requests that were not selected in step 602 are searched to identify non-selected requests that have demands that fit within the residuals determined in step 604. Each of the demands of a request identified in step 608 fits within the corresponding residuals. Step 608 is an example of step 504 of method 500. If at least one request is identified in step 608, then at step 610, a determination is made of which request ($r_w$) of the one or more requests identified in step 608 has the largest sum of the demands, and the set of requests selected for acceptance is updated to include this request ($r_w$). Step 610 is an example of step 506 of method 500. The residuals for each constraint are updated in step 612 by subtracting the corresponding demands of the request ($r_w$) determined in step 610. The method may then loop back to step 606 for a comparison of the sum of the residuals to the predetermined tolerance value.

Figure 6B:
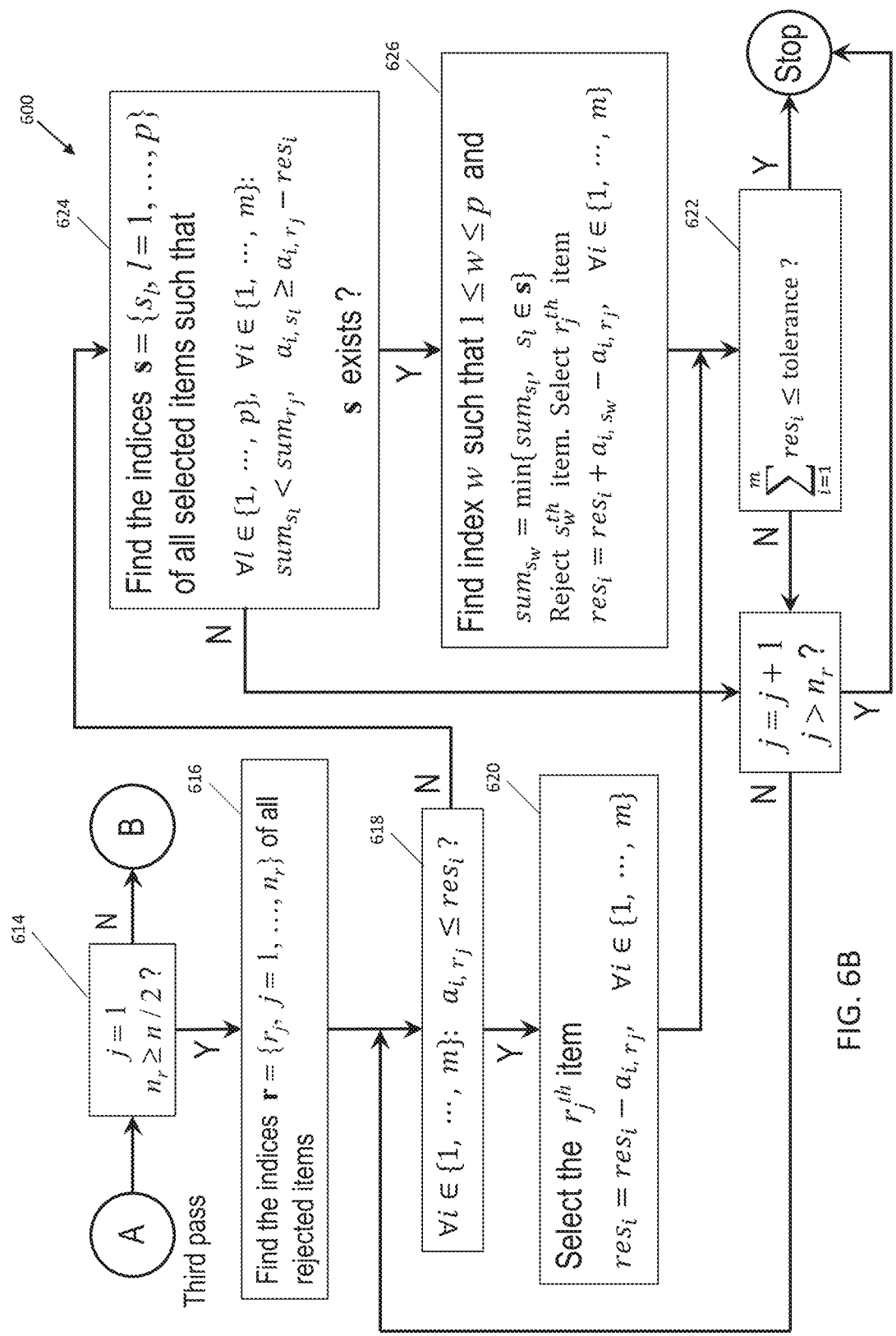

Returning to step 608, if there are no non-selected requests that have demands that fit within the residuals determined in step 604 (either in a first loop of steps 606-612 or any subsequent loop), then method 600 may proceed to step 614 shown in FIG. 6B. In some variations, the method may terminate at this point.

In step 614, a determination may be made whether the number of non-selected requests ($n_r$) is greater than the number of selected requests (the number of requests that are in the list of requests to accept—either the initial list or any updated list from any number of loops of steps 606-612). If so, then at step 616, the set of all non-selected requests are determined. Some variations do not include step 614.

At step 618, a non-selected request ($r_j$) of the set of non-selected requests is analyzed to determine whether it has a demand that can fit within the residuals. If so, then at step 620, the request is added to the set of requests to accept, and the set of residuals are updated by reducing them by the corresponding demands of the request added to the list of requests to accept. The sum of the residuals is compared to the predetermined tolerance value at step 622, which may be the same predetermined tolerance value as in step 606 or a different predetermined tolerance value. If the sum of the residuals is below the predetermined tolerance value, then the method may be terminated. If not, the method may return to step 618 for analysis of another non-selected request.

If the non-selected request ($r_j$) does not satisfy the requirement of step 618 (i.e., it does not have demands that fit within the residuals associated with a current set of requests to accept), then the method may proceed to step 624 in which a determination is made whether there are any selected requests for which the sum of the demands of the selected request is less than the sum of the demands of the non-selected request ($r_j$) and for which the demands of the selected request are greater than the difference between the demands of the non-selected request ($r_j$) and the corresponding residuals, resulting in a set s. If the set s is an empty set (i.e., no such selected request exists), then the method may return to step 618 for analysis of another non-selected request or may terminate if there are no further non-selected requests to analyze. If the set s includes just one request, then at step 626, that request is removed from the list of requests to accept and replaced by the non-selected request ($r_j$). If set s includes more than one request, then a determination is made which of the requests in the set s has a minimum sum of demands from among the requests of the set s. The request that has the minimum sum of demands is removed from the list of requests to accept and replaced by the non-selected request ($r_j$). The method may then return to step 622. Steps 614-626 are an exemplary implementation of step 508 of method 500 and are optional.

Figure 6C:
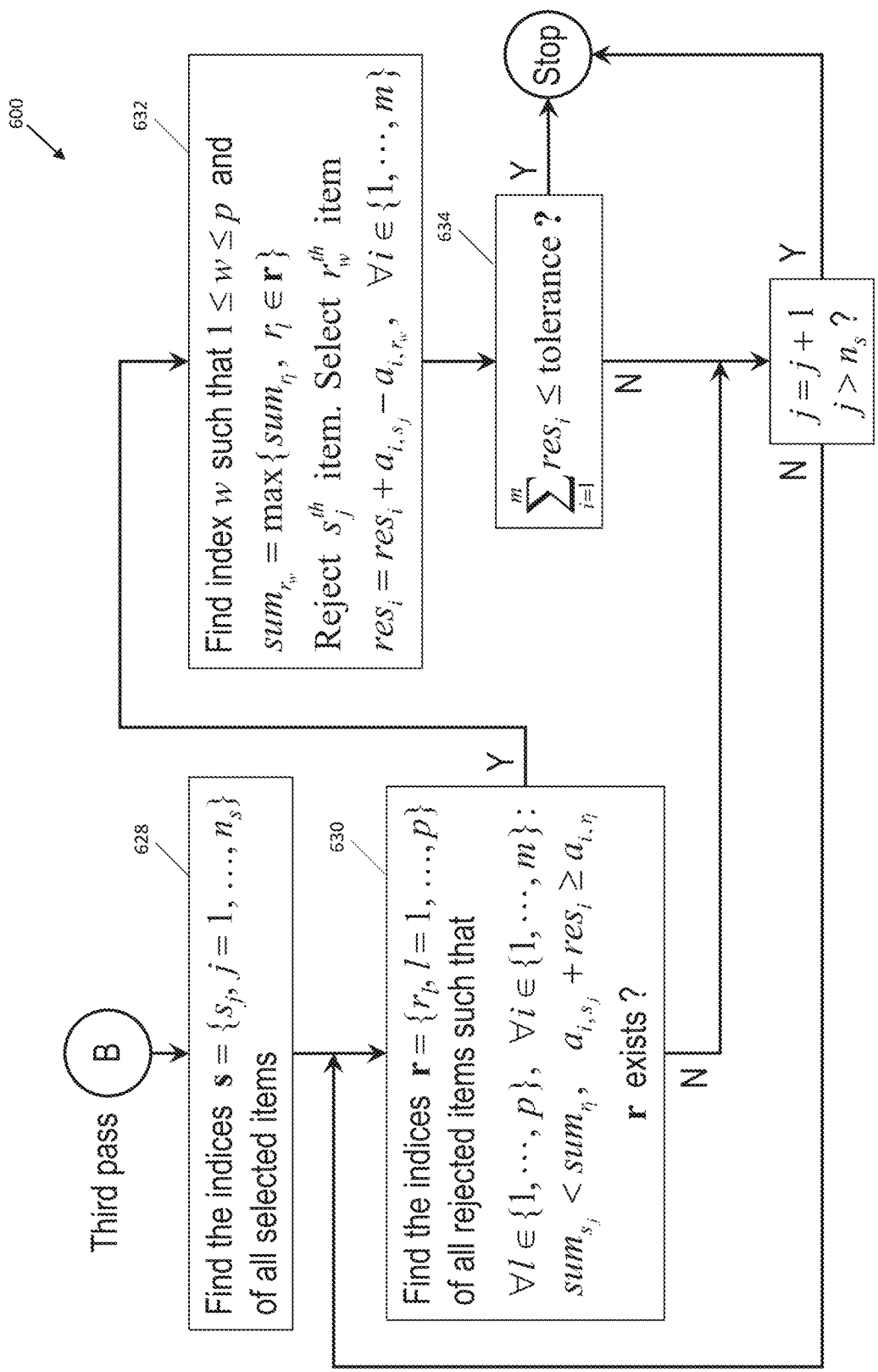

Returning to step 614 (for variations that include step 614), if the number of non-selected requests ($n_r$) is not greater than the number of selected requests, then at step 628 of FIG. 6C, the set of selected requests is determined and a first selected request ($s_j$) is selected. At step 630, the non-selected requests are analyzed to determine the set r of non-selected requests for which the sum of the demands of the selected request ($s_j$) is less than the sum of the demands of the non-selected request and for which each demand of the selected request ($s_j$) in combination with its corresponding residual is greater than the corresponding demand of the non-selected request. If there are none (i.e., set r is an empty set), then the method may return to step 630 for analysis of another selected request ($s_{j+1}$). If set r includes just one request, then at step 632, the selected request ($s_j$) is removed from the list of requests to accept and replaced by the request in the set r. If set r includes multiple requests, then the request ($r_w$) in the set r that has the maximum sum of demands from among the requests in the set r is selected, and the list of requests to accept is updated by removing the selected request ($s_j$) and replacing it with request $r_w$. At step 634, the sum of the residuals according to the updated list of requests to accept is compared to the predetermined tolerance value (which may be the same predetermined tolerance value as in step 606 and/or step 622). If the predetermined tolerance value is met, then the method may terminate. If not, then the method may return to step 630 for analysis of another non-selected request. Steps 628-634 are an exemplary implementation of step 508 of method 500 and are optional. In some variations, one or more of steps 628-634 are performed but not steps 616-626. In some variations, one or more of steps 616-626 are performed but not steps 628-634.

Methods 500 and 600 are described above as determining the set of requests to accept based on the demands of the requests. These methods may be modified by introducing one or more values associated with requests into the determination of which requests to accept, similar to method 300. As modified, the methods can be directed toward, among n requests, choosing the subset of the n requests that packs all m knapsacks (where m is the number of capabilities of the communication channel (each with its own capacity)) as close to their limits as possible while maximizing at least one aggregate value of the selection. The value can be any of the values described within.

With respect to an example of a satellite communication link having uplink and downlink data rate capacities (U and D, respectively), an exemplary method for determining which requests to accept that factors in values associated with the requests may include maximizing the aggregate value of the selection, subject to the uplink and downlink capacities, as follows:

$$\max_x \sum_{j=1}^n c_j x_j \text{ subject to } \sum_{j=1}^n u_j x_j \le U \text{ and } \sum_{j=1}^n d_j x_j \le D$$

where $c_j$ is the value (e.g., an amount to be paid by the requestor, a priority of the request, etc.) associated with request j, $x_j$ is the binary selection value for request j, n is the number of requests, and $u_j$ and $d_j$ are, respectively, the uplink and downlink data rates corresponding to the request j. This can be generalized to an arbitrary number of capabilities of the communication link as follows:

$$\max_x cx \text{ subject to } 0 \le a_i x \le b_i, a_i = 1 \times n \text{ real}, i = 1, \ldots, m$$

where there are m types of demand (e.g., data types) for m capabilities (e.g., dedicated communication channels for different data types) of the communication pathway, the capability (e.g., channel) dedicated to the $i^{th}$ type of demand (e.g., data type) has a maximum capacity (e.g., data rate) $b_i$, there are n requests, each having one or more types of demands (e.g., data type demands) for transmission of data over the communication pathway, the $j^{th}$ (j=1, ..., n) request has the $i^{th}$ (i=1, ..., m) demand type (e.g., data type) with demand (e.g., data rate) $a_{ij}$, the $j^{th}$ request's value=$c_j$(e.g., the fee paid to the service provider for the data transmission), and x is the set of binary selection values. With this approach, each demand type is packed into a knapsack and the system selects a subset of the n requests in order to maximize (e.g., within a certain predetermine tolerance) the aggregate value of the selection.

Relative to methods 500 and 600, the above approach, which seeks to optimize around one or more values associated with each request, includes adding to the existing demand type knapsacks (e.g., the data type knapsacks) one or more additional knapsacks (one or more artificial demands) for one or more values associated with the requests. The one or more additional "value" knapsacks are assigned very high capacities (that imposes practically no limit on the knapsack). Since methods 500 and 600 attempt to fill all the knapsacks to the extent possible (e.g., within some predetermined tolerance), the methods will also try to fill the additional artificial demand knapsack(s) to practically no limit, which means that the one or more values will be maximized to the extent possible (e.g., within some predetermined tolerance).

The examples described above included either selecting or rejecting a given request (e.g., a selection variable for a given request in methods described above may be either 0 or 1). In some examples, at least one demand of the requests can be represented as an integer multiple of a base demand, and determining which requests to accept can include representing at least one request as a plurality of artificial requests that each have the base demand in which a number of the plurality of artificial requests is the multiple of the base demand. In these examples, a selection variable can take some integer value other than 0 and 1, and the value associated with the request may determine how the requestor's request will be implemented by the communication pathway (e.g., determining a level of demand to accept for a respective request, rather than determining to accept or not accept the request). For example, a communication pathway may be configured to provide some data transmission rate that is a multiple of a base data transmission rate (e.g., 1 Mbps) and a request for 3× (e.g., 3 Mbps) the base data transmission rate may be implemented at some multiple of the base data transmission rate that may or may not be less than the requested data transmission rate (e.g., 2 Mbps instead of the requested 3 Mbps). Any of the methods described above (e.g., any of methods 200, 300, 400, 500, and 600) can be modified to implement this approach.

The following describes an exemplary application in which data rates in multiples of a base rate exist for the communication pathway that handles multiple data types in different channels, each having their own capacities. The $j^{th}$ request has the $i^{th}$ (i=1, ..., m) data type with lowest supported data rate $a_{ij}$. The $j^{th}$ request's maximum data rate for the $i^{th}$ data type is limited to $X_j a_{ij}$ for some integer $X_j \geq 1$. The $j^{th}$ request's value=$x_j c_j$ at the lowest data rates $\{a_{ij}, i=1, ..., m\}$ for all data types. The $j^{th}$ request's value=$x_j c_j$ at data rates $\{x_j a_{ij}, i=1, ..., m\}$ for all data types. The channel dedicated to the $i^{th}$ data type has a maximum capacity (data rate) $b_i$. The requests and the data rates for those requests may be selected by maximizing the aggregate value of the selection, subject to individual channel limits, according to:

$\max_x cx$ subject to $0 \leq a_i x \leq b_i$, $0 \leq x \leq X$ (n×1 bounded integer selection variable)

$c=[c_j]=1 \times n$ real, $a_i=[a_{ij}; j=1, ..., n]=1 \times n$ real, $i=1, ..., m$ The above can be represented via integer programming as follows:

$x=[x_1 \; x_2 \; ... \; x_n]$, where $x_k$ are integers satisfying $0 \leq x_k \leq N_k$, $k=1, ..., n$ $\max_x cx$ subject to $0 \leq Ax \leq b$, $A=[a_{ij}]_{m \times n}$, $b=[b_i]_{m \times 1}$, $c=1 \times n$ This problem can be solved using a binary integer programming technique by the augmentation of A. Partition A into column vectors as follows $A=[a_1 \; a_2 \; ... \; a_n]$. Augment A as follows $A_{aug}=[a_1 \; ... \; a_1 \; a_2 \; ... \; a_2 \; ... \; a_n \; ... \; a_n]$. In this augmentation, $a_1$ is repeated $N_1$ time, $a_2$ is repeated $N_2$ time, etc. The vector c is likewise augmented. The selection variable is now $x_{aug}$, a column vector with $$N = \sum_{i=1}^{n} N_n$$

entries. The integer programming problem is then mapped to the following binary integer programming problem:

$\max_x c_{aug} x_{aug}$ subject to $0 \leq A_{aug} x_{aug} \leq b$

Once the solution $x_{aug}$ has been found, x (the set of values of the selection variables for the requests) can be determined by counting the number of 1's in the appropriate group of entries of $x_{aug}$. The maximization in this problem can be done using any of methods 200, 300, 400, 500, and 600.

The methods described above may be computationally efficient such that they can be implemented in a system to manage requests in a timely manner (e.g., in real time). The above methods may be more computationally efficient than methods that seek to find an exact solution. Use of the methods described in a data communication network can improve the data communication network by enabling the data communication network to select requests to accept in a manner that maximizes at least one attribute of the operation of the data communication network (e.g., value to the network operator) within a suitable tolerance that enables solutions to be determined in a computationally efficient manner.

Although the examples described above are directed to optimizing data communication in a data communication network, the optimization techniques can be used for any application in which the demands for a resource exceed the capacities of the resource. For example, the optimization techniques can be used for a logistics network in which the demands for use of a particular transportation pathway at a particular time exceeds the capacity limit of the transportation pathway.

Figure 7:
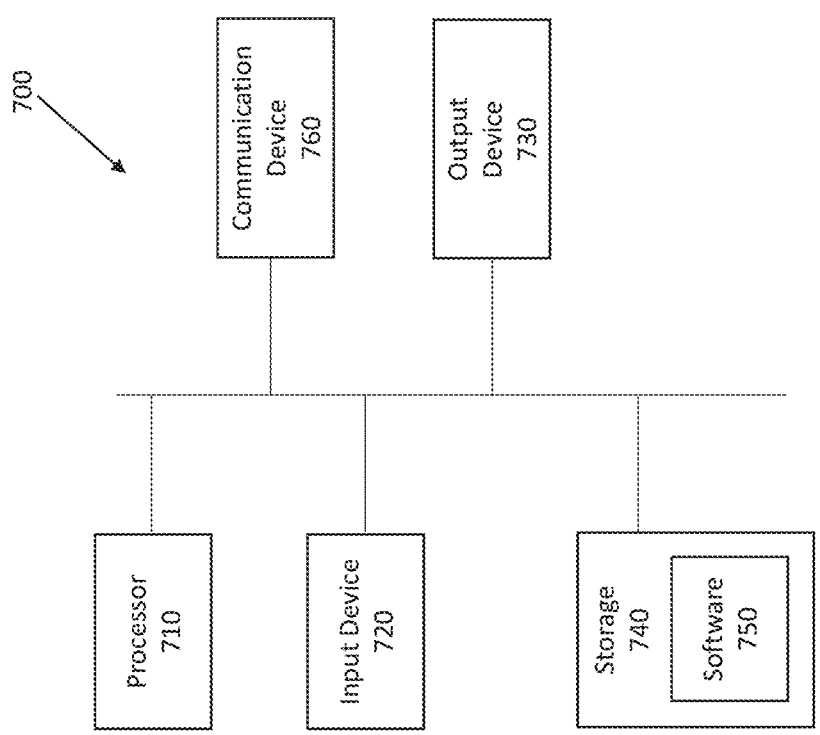
FIG. 7 is an exemplary computing system.

FIG. 7 illustrates an example of a computing system 700 that can be used for one or more components of network 100 of FIG. 1, such as one or more data transmission nodes 104, one or more end nodes 102, and/or one or more control computing systems 108. System 700 can be a computer connected to a data communication network. System 700 can be a client or a server. System 700 can be any suitable type of processor-based system, such as a personal computer, workstation, server, handheld computing device (portable electronic device) such as a phone or tablet, or dedicated device. System 700 can include, for example, one or more of input device 720, output device 730, one or more processors 710, storage 740, and communication device 760. Input device 720 and output device 730 can generally correspond to those described within and can either be connectable or integrated with the computer.

Input device 720 can be any suitable device that provides input, such as a touch screen, keyboard or keypad, mouse, gesture recognition component of a virtual/augmented reality system, or voice-recognition device. Output device 730 can be or include any suitable device that provides output, such as a display, touch screen, haptics device, virtual/augmented reality display, or speaker.

Storage 740 (also referred to herein as memory) can be any suitable device that provides storage, such as an electrical, magnetic, or optical memory including a RAM, cache, hard drive, removable storage disk, or other non-transitory computer readable medium. Communication device 760 can include any suitable device capable of transmitting and receiving signals over a network, such as a network interface chip or device. The components of the computing system 700 can be connected in any suitable manner, such as via a physical bus or wirelessly.

Processor(s) 710 can be any suitable processor or combination of processors, including any of, or any combination of, a central processing unit (CPU), field programmable gate array (FPGA), and application-specific integrated circuit (ASIC). Software 750, which can be stored in storage 740 and executed by one or more processors 710, can include, for example, the programming that embodies the functionality or portions of the functionality of the present disclosure (e.g., as embodied in the devices as described above), such as programming for performing one or more steps of method 200 of FIG. 2, method 300 of FIG. 3, method 400 of FIGS. 4A-E, method 500 of FIG. 5, and/or method 600 of FIGS. 6A-C.

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport computer readable medium can include, but is not limited to, an electronic, magnetic, optical, electromagnetic, or infrared wired or wireless propagation medium.

System 700 may be connected to a data communication network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, satellite communication connections, T1 or T3 lines, cable networks, DSL, or telephone lines.

System 700 can implement any operating system suitable for operating on the network. Software 750 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for managing data transmissions of a communication network comprising:
  receiving requests from a plurality of data transmission requestors requesting data transmissions via a communication pathway of a communication network, the communication pathway having at least one data transmission constraint that is exceeded by an aggregate of at least one corresponding demand of the requests; and
  determining which requests to accept such that the at least one data transmission constraint is not exceeded, wherein determining which requests to accept comprises:
    selecting a set of requests to accept based on value densities of the requests such that the at least one data transmission constraint is not exceeded, wherein the value densities are each a function of a value associated with at least one characteristic of a respective request and the at least one demand of the respective request, and wherein a total of the at least one demand of the selected set of requests to accept is less than the at least one data transmission constraint by at least one residual amount,
    determining a first non-selected request for which the at least one demand of the first non-selected request does not exceed the at least one residual amount,
    determining whether a second non-selected request exists for which: (1) a value density of the second non-selected request is greater than a combined value density of the first non-selected request and a request of the selected set of requests that has a lowest value density, and (2) a demand of the second non-selected request is the largest demand among all non-selected requests meeting requirement (1) that is no larger than a sum of the at least one residual amount and a demand of the request of the selected set of requests that has the lowest value density, in accordance with determining that the second non-selected request exists, updating the selected set of requests to accept by replacing the selected request having the lowest value density of the selected set of requests with the second non-selected request, and in accordance with determining that the second non-selected request does not exist, updating the selected set of requests to accept to include the first non-selected request.

2. The method of claim 1, wherein the at least one demand comprises a data communication rate demand and the at least one data transmission constraint comprises a data communication rate capacity.

3. The method of claim 1, wherein the at least one demand comprises an uplink demand and a downlink demand and the at least one data transmission constraint comprises an uplink constraint and a downlink constraint.

4. The method of claim 1, wherein the at least one demand comprises multiple data communication rate demands for different data types and the at least one data transmission constraint comprises corresponding data communication rate capacities for the different data types.

5. The method of claim 1, wherein the communication pathway comprises at least one satellite.

6. The method of claim 1, wherein the communication pathway comprises at least one router.

7. The method of claim 1, wherein the at least one characteristic of each of the requests is a price paid by a respective requestor for communication via the communication pathway.

8. The method of claim 1, wherein the at least one characteristic of each of the requests is a priority associated with the respective request or the respective requestor.

9. The method of claim 1, wherein the at least one demand can be represented as a multiple of a base demand, and determining which requests to accept comprises representing at least one request as a plurality of artificial requests that each have the base demand, wherein a number of the plurality of artificial requests is the multiple of the base demand.

10. The method of claim 9, wherein determining which requests to accept comprises determining a demand to accept for a respective request based on a number of artificial requests associated with the respective request that are in the set of requests to accept.

11. The method of claim 1, comprising transmitting data via the communication pathway according to the determination of which requests to accept.

12. The method of claim 1, wherein selecting the set of requests to accept based on value densities of the requests such that the at least one data transmission constraint is not exceeded comprises ranking the requests based on the value densities and selecting a first k requests in the ranking having the highest value densities that, in aggregate, do not exceed the at least one data transmission constraint.

13. The method of claim 1, wherein updating the selected set of requests to accept generates an updated set of requests to accept, and wherein determining which requests to accept comprises determining a request that is not in the updated set of requests to accept that can replace at least one request in the updated set of requests to accept to increase a total of the value associated with the at least one characteristic for the requests to accept.

14. A system for managing data transmissions of a communication network, the system comprising:

one or more processor and memory storing one or more programs executable by the one or more processors, the one or more programs including instructions for causing the one or more processors to:

receive requests from a plurality of data transmission requestors requesting data transmissions via a communication pathway of a communication network, the communication pathway having at least one data transmission constraint that is exceeded by an aggregate of at least one corresponding demand of the requests; and determine which requests to accept such that the at least one data transmission constraint is not exceeded, wherein determining which requests to accept comprises:

selecting a set of requests to accept based on value densities of the requests such that the at least one data transmission constraint is not exceeded, wherein the value densities are each a function of a value associated with at least one characteristic of a respective request and the at least one demand of the respective request, and wherein a total of the at least one demand of the selected set of requests to accept is less than the at least one data transmission constraint by at least one residual amount, determining a first non-selected request for which the at least one demand of the first non-selected request does not exceed the at least one residual amount, determining whether a second non-selected request exists for which: (1) a value density of the second non-selected request is greater than a combined value density of the first non-selected request and a request of the selected set of requests that has a lowest value density, and (2) a demand of the second non-selected request is the largest demand among all non-selected requests meeting requirement (1) that is no larger than a sum of the at least one residual amount and a demand of the request of the selected set of requests that has the lowest value density, in accordance with determining that the second non-selected request exists, updating the selected set of requests to accept by replacing the selected request having the lowest value density of the selected set of requests with the second non-selected request, and in accordance with determining that the second non-selected request does not exist, updating the selected set of requests to accept to include the first non-selected request.

15. The system of claim 14, wherein the at least one demand comprises a data communication rate demand and the at least one data transmission constraint comprises a data communication rate capacity.

16. The system of claim 14, wherein the at least one demand comprises an uplink demand and a downlink demand and the at least one data transmission constraint comprises an uplink constraint and a downlink constraint.

17. The system of claim 14, wherein the at least one demand comprises multiple data communication rate demands for different data types and the at least one data transmission constraint comprises corresponding data communication rate capacities for the different data types.

18. The system of claim 14, wherein the communication pathway comprises at least one satellite.

19. The system of claim 14, wherein the communication pathway comprises at least one router.

20. The system of claim 14, wherein the at least one characteristic of each of the requests is a price paid by a respective requestor for communication via the communication pathway.

21. The system of claim 14, wherein the at least one characteristic of each of the requests is a priority associated with the respective request or the respective requestor.

22. The system of claim 14, wherein the at least one demand can be represented as a multiple of a base demand, and determining which requests to accept comprises representing at least one request as a plurality of artificial requests that each have the base demand, wherein a number of the plurality of artificial requests is the multiple of the base demand.

23. The system of claim 22, wherein determining which requests to accept comprises determining a demand to accept for a respective request based on a number of artificial requests associated with the respective request that are in the set of requests to accept.

24. The system of claim 14, comprising transmitting data via the communication pathway according to the determination of which requests to accept.

25. The system of claim 14, wherein selecting the set of requests to accept based on value densities of the requests such that the at least one data transmission constraint is not exceeded comprises ranking the requests based on the value densities and selecting a first k requests in the ranking having the highest value densities that, in aggregate, do not exceed the at least one data transmission constraint.

26. The system of claim 14, wherein updating the selected set of requests to accept generates an updated set of requests to accept, and wherein determining which requests to accept comprises determining a request that is not in the updated set of requests to accept that can replace at least one request in the updated set of requests to accept to increase a total of the value associated with the at least one characteristic for the requests to accept.

* * * * *